US006932263B2

(12) United States Patent
Kilabarda et al.

(10) Patent No.: US 6,932,263 B2
(45) Date of Patent: Aug. 23, 2005

(54) VEHICLE FRAMING SYSTEM FOR PLURALITY OF VEHICLE BODY STYLES

(75) Inventors: Velibor Kilabarda, Birmingham, MI (US); Leonard A. Zanger, Bloomfield Hills, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 177 days.

(21) Appl. No.: 10/401,471

(22) Filed: Mar. 28, 2003

(65) Prior Publication Data

US 2003/0189085 A1 Oct. 9, 2003

Related U.S. Application Data

(60) Provisional application No. 60/370,891, filed on Apr. 8, 2002.

(51) Int. Cl.[7] ............................................... B23K 37/04
(52) U.S. Cl. ..................................................... 228/49.1
(58) Field of Search ............................. 228/212, 44.3, 228/49.1; 219/117.1, 80, 86.24, 79, 127, 158, 161; 29/430, 464, 469, 466

(56) References Cited

U.S. PATENT DOCUMENTS

| | | | |
|---|---|---|---|
| 4,162,387 A | 7/1979 | De Candia | |
| 4,442,335 A | 4/1984 | Rossi | |
| 4,494,687 A | 1/1985 | Rossi | |
| 4,638,902 A | 1/1987 | Kellner et al. | |
| 4,667,866 A | * 5/1987 | Tobita et al. | 228/4.1 |
| 4,673,075 A | * 6/1987 | Ueyama et al. | 198/339.1 |
| 4,682,722 A | 7/1987 | Bossotto et al. | |
| 4,721,005 A | * 1/1988 | Yoshiji et al. | 74/490.04 |
| 4,738,387 A | 4/1988 | Jaufmann et al. | |
| 4,776,085 A | 10/1988 | Shiiba | |
| 4,795,075 A | 1/1989 | Pigott et al. | |
| 4,811,891 A | 3/1989 | Yamaoka et al. | |
| 4,856,701 A | 8/1989 | Pöckl | |
| 4,893,398 A | 1/1990 | Zimmer | |
| 4,905,884 A | 3/1990 | Alborante et al. | |
| 4,928,386 A | 5/1990 | Schupp et al. | |
| 4,972,987 A | * 11/1990 | Di Rosa | 228/4.1 |
| 4,991,707 A | 2/1991 | Alexander et al. | |
| 5,011,068 A | 4/1991 | Soutenburg et al. | |
| 5,037,022 A | 8/1991 | Rossi | |
| 5,115,115 A | 5/1992 | Alborante | |
| 5,141,093 A | 8/1992 | Alexander | |
| 5,143,270 A | 9/1992 | Hamada et al. | |

(Continued)

Primary Examiner—Jonathan Johnson
(74) Attorney, Agent, or Firm—Young & Basile, P.C.

(57) ABSTRACT

An apparatus and method for randomly interchanging up to four pairs of side framing gates at a framing station of a vehicle assembly line while maintaining a predetermined build cycle time interval of the assembly line. The system employs first and second carousels positioned on opposite sides of the assembly line upstream of the framing station and third and fourth carousels positioned on opposite sides of the production line downstream of the framing station. The system further includes a first linear track structure extending from the first carousel to a first side of the framing station, a second linear track structure extending from the second carousel to a second, opposite side of the framing station, a third linear track structure extending from the third carousel to the first side of the framing station, a third linear track structure extending from the third carousel to the first side of the framing station, and a fourth linear track structure extending from the fourth carousel to the second side of the framing station. The carousel includes at least two sides, possibly three sides, four sides or more, each side capable of receiving a framing gate. The framing gates positioned at the framing station are randomly interchanged by a combination of rotary movements of the carousels and linear movements of framing gates along the linear track structures.

27 Claims, 22 Drawing Sheets

U.S. PATENT DOCUMENTS

| | | |
|---|---|---|
| 5,151,570 A | 9/1992 | Sakurai |
| 5,174,488 A | 12/1992 | Alborante |
| 5,184,766 A | 2/1993 | Takahashi et al. |
| 5,258,598 A | 11/1993 | Alborante |
| 5,265,317 A * | 11/1993 | Angel .................. 29/429 |
| 5,343,996 A | 9/1994 | Nuschak |
| 5,374,799 A * | 12/1994 | Nishimoto et al. ...... 219/117.1 |
| 5,397,047 A | 3/1995 | Zampini |
| 5,400,943 A | 3/1995 | Rossi |
| 5,400,944 A * | 3/1995 | Zimmer et al. ............ 228/49.6 |
| 5,409,158 A | 4/1995 | Angel |
| 5,427,300 A | 6/1995 | Quagline |
| 5,560,535 A | 10/1996 | Miller et al. |
| 6,008,471 A | 12/1999 | Alborante |
| 6,170,732 B1 * | 1/2001 | Vogt et al. .................. 228/4.1 |
| 6,173,881 B1 | 1/2001 | Sloan et al. |
| 6,457,574 B1 | 10/2002 | Semmlinger et al. |
| 6,477,880 B1 | 11/2002 | Zimmer |
| 6,612,011 B2 | 9/2003 | Mayr et al. |
| 6,615,112 B1 | 9/2003 | Roos |

* cited by examiner

FIG - 24
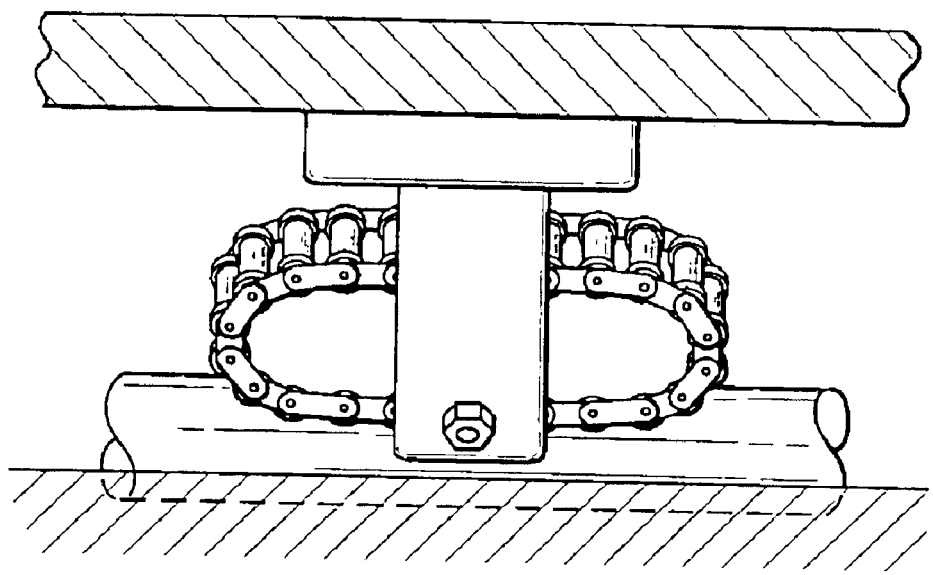
FIG - 25
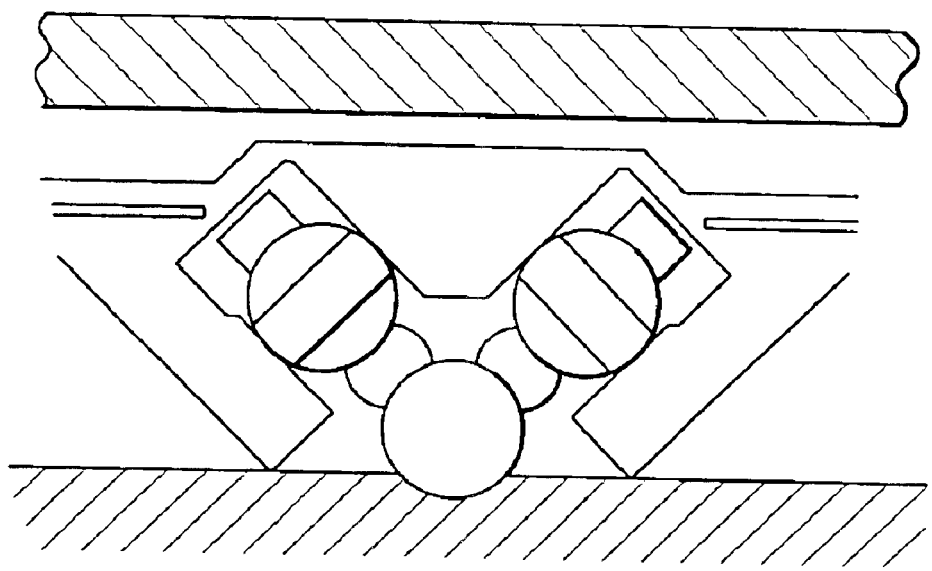
FIG - 26

VEHICLE FRAMING SYSTEM FOR PLURALITY OF VEHICLE BODY STYLES

CROSS-REFERENCE TO RELATED APPLICATIONS

This application claims benefit of U.S. Provisional 60/370,891 filed on Apr. 8, 2002, which is incorporated by reference herein in its entirety.

FIELD OF THE INVENTION

The present invention relates to an assembly line framing system for clamping and thereafter welding a loosely assembled motor vehicle body, a framing system that accurately positions and locates predetermined areas of a loosely assembled motor vehicle body for accurately clamping and welding the vehicle body together with a high degree of repeatability between consecutive vehicle bodies on the assembly line, and more particularly a framing system especially adapted to weld a plurality of different predetermined vehicle body styles without interrupting the predetermined build cycle time interval of the assembly line.

BACKGROUND OF THE INVENTION

The construction of a unitized vehicle body commences with the formation of individual major body panels by stamping the panels from sheet metal blanks. Typically, these major panels include a floor panel, right and left body side panels, a fire wall and either a roof panel or transversely extending inner members to which a roof panel is subsequently mounted. After the individual panels are stamped, some preliminary assembly operations can then be performed on the individual panels such as for example adding door hinge and latch hardware to body side panels at appropriate locations proximate the door openig, adding seat mounting brackets and reinforcements to the floor panels, etc.

Next a set of panels that together constitute a subassembly of the finished vehicle body is loosely assembled together. This initial loose assembly of panels frequently is accomplished by a "toy tab" arrangement in which one or more panels is formed with a tab which projects from an edge and which is received in a slot in an adjacent panel. This technique interlocks the panels and frame members to each other to form a preliminary loosely assembled vehicle body wherein the panels and frame members will not separate from each other but the panels and frame members can tilt or move relative to one another. This initial loosely assembled subassembly is then moved along the assembly line to a framing station where the various panels and frames are welded to each other to form a rigid permanently assembled vehicle body.

The welding operation step at the framing station is one of the most important steps in the assembly of the vehicle body because it establishes the final welded alignment of the various panels and headers relative to each other which is essential to subsequent assembly operations performed on the subassembly. During the welding operation it is critical that the various panels and headers be precisely and accurately located and aligned relative to one another and be held fixedly in the desired position. The positioning of the various panels and header members during the welding operation typically is accomplished by a pair of side framing gates which are positioned on opposite sides of the assembly line and which carry a plurality of individual clamps arranged thereon to clamp the various body components in desired positions.

It is desirable to perform as many welding operations as possible at the initial framing station since the relative positioning of the various panels and headers is critical to the ability to precisely relocate and reclamp the vehicle body at subsequent stations along the assembly line. Due to variations between assembly stations and variation in movement of the various panels and headers it is impossible to subsequently relocate and reclamp the vehicle body without inadvertently stacking up tolerances or creating variances between the relative positioning of various panels and headers. Therefore it is desirable to frame as much of the vehicle body as possible at the same framing station so that a maximum number of welding operations can be performed on the vehicle body without having to subsequently reclamp and relocate the vehicle body since reclamping and relocating can increase the tolerances between the relative positions of the various panels and headers of the vehicle body and decrease the repeatability between consecutive vehicle bodies in the production line.

It is common practice in the present automotive industry for one particular car model to be offered in several different body styles. Accommodating each body style requires clamping and welding different body locations as well as gaining access to different body areas so that the clamping and welding apparatus can be properly positioned while extending through the framing gates. To avoid having to provide separate assembly lines and framing stations for the different body styles of a particular car model, it is desirable to provide a single framing station that can be adapted to accommodate a plurality of different body styles in a quick and efficient manner while insuring the accuracy and repeatability that are required of the welding operation.

SUMMARY OF THE INVENTION

The present invention provides a framing system that accurately and efficiently clamps and welds a loosely assembled vehicle body with a high degree of repeatability between consecutive vehicle bodies in a production line while also being able to adapt to a plurality of different loosely assembled body components, corresponding to different vehicle body styles, in a quick and efficient manner. Specifically, the present invention provides a framing system wherein a plurality of vehicle body styles can be interchangeably accommodated at a single framing station without interrupting the predetermined build cycle time interval of the assembly line. More specifically, the present invention provides a framing station wherein four different body styles can be interchangeably accommodated at a single framing station without interrupting the predetermined build cycle time interval of the assembly line.

The body framing system of the invention is intended for use with a vehicle assembly line in which loosely preassembled vehicle bodies are moved incrementally along a single assembly line from station to station, successive loosely preassembled vehicle bodies arrive at a framing station along the production line at predetermined build cycle time intervals, and each loosely preassembled vehicle body arriving at the framing station is welded to form a rigid vehicle body. According to the invention, the body framing system includes the framing station, a plurality of more than three pairs of opposed side framing gates for positioning at opposite sides of the framing station for use in welding a respective plurality of more than three vehicle body styles to allow the random production of the plurality of more than three vehicle body styles on the single assembly line, and a transfer apparatus assembly operative to randomly exchange any of the plurality of pairs of side framing gates positioned at the framing station with any other of the plurality of pairs of side framing gates within the predetermined build cycle time interval. This arrangement allows the random production interchange of the more than three vehicle body styles on the single assembly line while maintaining the predetermined build cycle time interval.

According to the present invention, the transfer apparatus assembly includes a rotary transfer apparatus coacting with a linear transfer apparatus. This coacting arrangement facilitates the random interchange of the more than three pairs of opposed side framing gates at the framing station. According to the present invention, the rotary transfer apparatus delivers framing gates to the linear transfer apparatus for delivery to the framing station. This specific rotary and linear coaction further facilitates the random interchange of the framing gates at the framing station. According to the present invention, the rotary transfer apparatus includes first and second carousels positioned on opposite sides of the assembly line upstream of the framing station and third and fourth carousels positioned on opposite sides of the assembly line downstream of the framing station. This arrangement allows the movement of framing gates into the framing station from positions both upstream and downstream of the framing station.

According to the present invention, the linear transfer apparatus includes a first linear track system extending from the first carousel to a first side of the framing station, a second linear track structure extending from the second carousel to a second opposite side of the framing station, a third linear track structure extending from the third carousel to the first side of a framing station, and a fourth linear track structure extending from the fourth carousel to the second opposite side of the framing station. This arrangement facilitates the movement of the framing gates to the framing station from positions upstream and downstream of the framing station.

According to the present invention, each carousel has a configuration including at least two sides, each side capable of receiving a framing gate. This arrangement allows the storage and random delivery of four pairs of framing gates representing four vehicle body styles to the framing station. In the illustrated embodiment of the invention, each carousel has three sides, wherein with the first pair of framing gates positionable on opposite sides of the framing station, the second pair of framing gates positionable on respective first sides of the first and second carousels, the third pair of framing gates positionable on respective second sides of the first and second carousels, and the fourth pair of framing gates positionable on respective first sides of the third and fourth carousels, all of the pairs of framing gates can be randomly interchanged by at least one of linear gate movements along the linear track structures, rotary movements of the carousels, and a combination of rotary movements of the carousels and linear gate movements along the linear track structures.

According to the present invention, the framing station can include a base structure, a first pair of spaced pillars mounted on the base structure on the first side of the framing station, and a second pair of spaced pillars mounted on the base structure on the second side of the framing station, the first and second pairs of pillars moveable on the base structure between outboard positions spaced outwardly from the assembly line and inboard positions proximate the assembly line, the first pair of pillars in its outboard position linearly aligned with the first and third linear track structures, and the second pair of pillars in its outboard position linearly aligned with the second and fourth linear track structures. This arrangement allows the framing gates to be delivered to the respective pillar pairs along the respective linear track structures with the pillar pairs in the outboard positions, thereafter the pillar pairs can be moved to the inboard positions to position the framing gates proximate the assembly line where the framing gates can clampingly engage the loosely preassembled bodies preparatory to the welding operation.

The present invention can also include a carousel for use in delivering framing gates to a framing station on a vehicle body assembly line. According to the present invention, the carousel can include a base structure positioned proximate the assembly line and having a support surface and a central pivot shaft upstanding from the support surface, a carousel body supported on the support surface, mounted on the pivot shaft for rotary movement about the axis of the pivot shaft, and defining a plurality of sides each adapted to receive a framing gate, means operative for generating an air cushion between the support surface and an underface of the carousel body to lift the carousel body off of the support surface, and means operative for applying a turning force to the lifted body. This arrangement allows the carousel body to be readily rotated about the pivot axis to bring successive sides of the carousel body into a position proximate the assembly line to facilitate delivery of the framing gates to the framing station.

According to the present invention, the operative air cushion generating means can include a plurality of air bags positioned on the underface of the carousel body, each air cushion including a plurality of apertures in confronting relation to the support surface. With this arrangement, pressurized air delivered to the airbags can inflate the bags to raise the carousel body off from the support surface and air escaping from the airbags through the apertures can generate an air cushion between the airbags and the support surface to facilitate selective rotation of the carousel.

According to the present invention, the carousel is intended for use with a linear track structure having one end positioned proximate the framing station and a free end, each side of the carousel body including a carousel track structure for supporting a respective framing gate and configured to be aligned with the free end of the linear track structure as the respective side of the carousel body is moved into a position proximate the assembly line. With this arrangement, the framing gate can be readily slid off from the carousel track structure and onto the linear track structure for deliver to the framing station.

The present invention can also include a transfer apparatus for use in delivering framing gates to a framing station on a vehicle body assembly line. According to the present invention, the transfer apparatus includes a linear track structure having one end positioned proximate the framing station and a free end, a carousel positioned proximate the assembly line, defining a plurality of sides each adapted to receive a framing gate, and mounted for rotation about a central axis to bring successive sides of the carousel into a position proximate the free end of the track structure and in linear alignment with the track structure, and a transfer device operative to move a gate positioned on a side of the carousel in alignment with the track structure from the carousel side, onto the track structure, and along the track structure to the framing station. This arrangement facilitates the transfer of a framing gate from the carousel to the framing station. According to the present invention, the transfer device includes a trolley operative to engage a gate and move the gate along the track structure to the framing station. This arrangement further facilitates the movement of the gate from the carousel to the framing station. According to the present invention, each side of the carousel includes a carousel track structure for supporting a framing gate positioned on the respective side of the carousel and configured to be aligned with the free end of a linear track structure as the respective side of the carousel is moved into a position proximate the free end of the linear track structure. This arrangement further facilitates the ready transfer of the framing gate from the carousel to the framing station.

According to the present invention, the transfer apparatus can include a first latch device for latching a framing gate to a respective side of the carousel, a base structure supporting the carousel, a second latch device for latching the carousel to the base structure, and a latch control device operative in response to arrival of a carousel side at a position proximate the free end of the linear track structure to actuate the second latch device to latch the carousel to the base structure and release the first latch device to release the framing gate from the carousel and allow the trolley to move the released framing gate along the linear track structure to the framing station. This arrangement further facilitates the ready transfer of the framing gate from the carousel to the framing station. According to the present invention, the transfer apparatus can include a third latch device to latch the trolley to a framing gate, the third latch device is actuated prior to release of the first latch device and following engagement of the second latch device, and the first latch device is released following engagement of the third latch device. This arrangement allows the trolley to move the released framing gate to the framing station. According to the present invention, the base structure defines a support surface, the transfer apparatus can include cushion means operative for generating an air cushion between the support surface and an underface of the carousel to lift the carousel off of the support surface, and turning means operative for applying a turning force to the lifted carousel to rotate the carousel about the central axis to bring successive sides of the carousel into position proximate the free end of the track structure and in linear alignment with the track structure, and the second latch device is released following actuation of the cushion means, thereafter the turning means is actuated to bring a respective side of the carousel carrying a respective framing gate into alignment with the linear track structure, thereafter the second linear latch device is actuated to latch the carousel to the base structure, thereafter the third latch device is actuated to latch the trolley to the respective framing gate, thereafter the first latch device is released to release the respective framing gate from the carousel, thereafter the trolley is actuated to move the respective framing gate to the framing station. This arrangement allows the smooth, rapid and precise delivery of framing gates from the carousel to the framing station.

The present invention further includes a method for moving pairs of framing gates to a framing station on a motor vehicle assembly line where loosely preassembled vehicle bodies are clamped by the framing gate pairs while the bodies are welded to form a rigid vehicle body. The method can include the steps of providing a pair of carousels, each carousel having a plurality of substantially flat sides, positioning the carousels along and on opposite sides of the assembly line in spaced relation to the framing station, mounting the carousels for rotation to bring successive sides of the carousels into a discharge position proximate and substantially parallel to the assembly line, positioning a pair of framing gates on one side of the respective pair of carousels, rotating the carousels to bring the one carousel sides into the discharge position, discharging the framing gates from the carousels, and sliding the framing gates along the assembly line to opposite sides of the framing station. This methodology facilitates the delivery of a plurality of pairs of framing gates, corresponding to a plurality of vehicle body styles, to the framing station. According to the present invention, the method can include the further steps of providing linear track structures extending from each carousel to the framing station, and the sliding step of the discharged framing gates along the assembly lines to the framing station can include the step of sliding the discharged framing gates along the linear track structures to the framing stations. This methodology further facilitates the delivery of the discharged framing gates to the framing station.

According to the present invention, the rotating step of the carousels can include the steps of generating an air cushion between an underface of the carousels and a support surface to lift the carousels off of the support surface, and thereafter applying a turning force to the lifted carousels. This arrangement allows the carousel rotation to be performed in a minimum amount of time, thereby minimizing the time required to perform the total framing gate interchange at the framing station.

According to the present invention, the pair of carousels can include a first pair of carousels positioned upstream on the assembly line from the framing station, the pair of framing gates can include a first pair of framing gates, the sliding step of the discharged framing gates along the assembly line to opposite sides of the framing station can include the steps of sliding the framing gates downstream to the framing station, providing a second pair of carousels each having a plurality of substantially flat sides, positioning the second pair of carousels along and on opposite sides on the assembly line downstream of the framing station, mounting the second pair of carousels for rotation to bring successive sides of the second pair of carousels into a discharge position proximate and substantially parallel to the assembly line, positioning a second pair of framing gates on one side of the respective second pair of carousels, rotating the second pair of carousels to bring the one sides of the second pair of carousels into the discharge position, discharging the second pair of framing gates from the second pair of carousels, and sliding the discharged second pair of framing gates upstream to the framing station. This methodology allows the precise and rapid delivery of framing gates to the framing station from locations both upstream and downstream of the framing station.

According to the present invention, the method can include the steps of providing a third pair of framing gates, positioning the third pair of framing gates on a second side of one of the first and second pairs of carousels, and discharging the third pair of framing gates from the second side of the respective carousels for delivery to the framing station. This methodology allows the random interchange of three pairs of framing gates at the framing station without interrupting the build cycle time interval of the assembly line.

According to the present invention, the method can include the steps of providing a fourth pair of framing gates, positioning the fourth pair of framing gates on opposite sides of the framing station, and randomly interchanging the pair of framing gates positioned at the framing station by selective rotation of the carousels and selective sliding movement of the framing gates between the framing station and the carousels. This methodology allows the random interchange of four pairs of framing gates at the framing station without interrupting the build cycle time interval of the assembly line.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIGS. 24, 25 and 26 are elevational, cross-sectional and perspective views, respectively, of a caterpillar bearing used in the framing system according to the present invention;

DESCRIPTION OF THE PREFERRED EMBODIMENT

Figure 1:
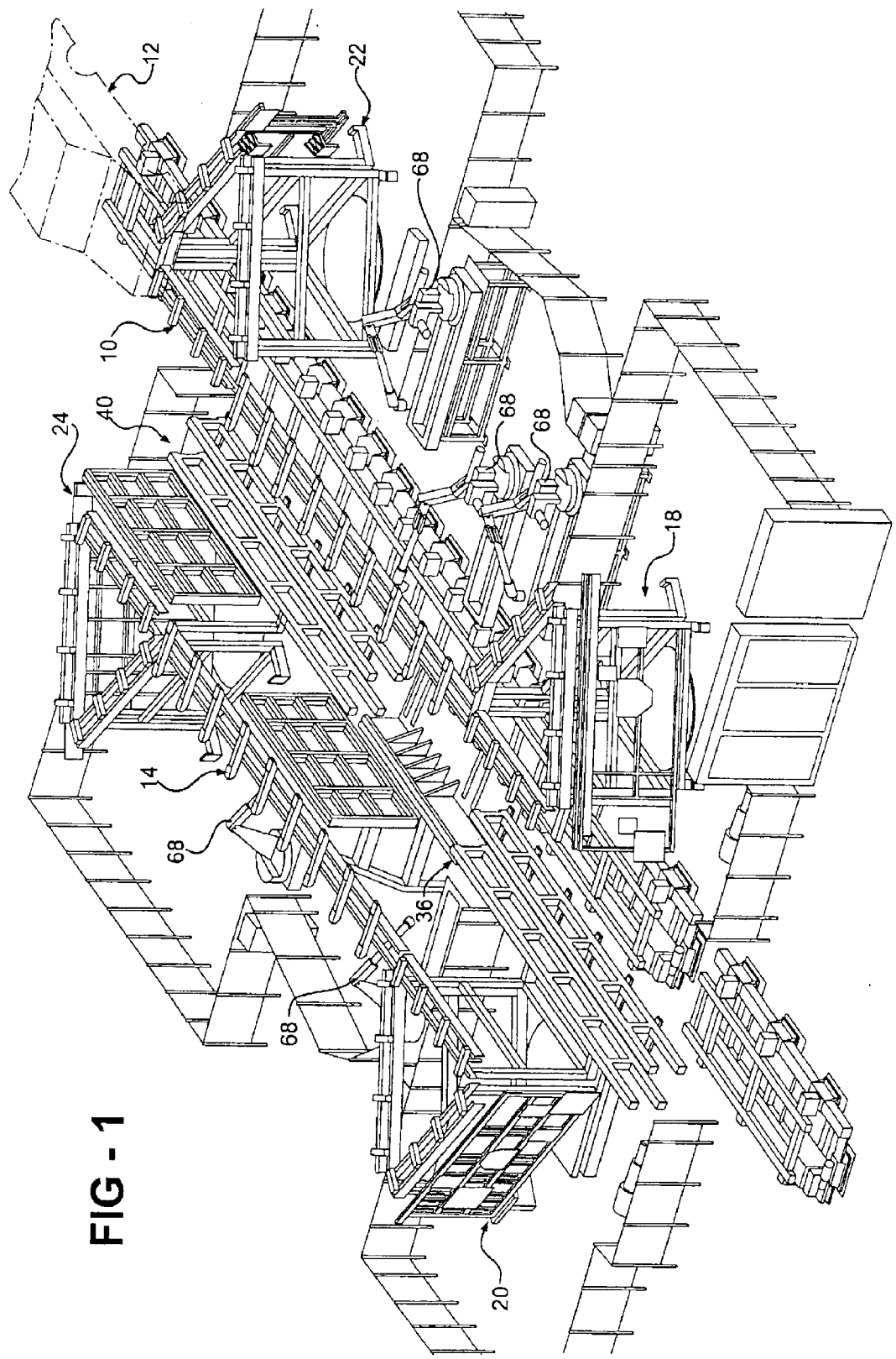
FIG. 1 is a perspective view of a body framing system according to the present invention.
Figure 2:
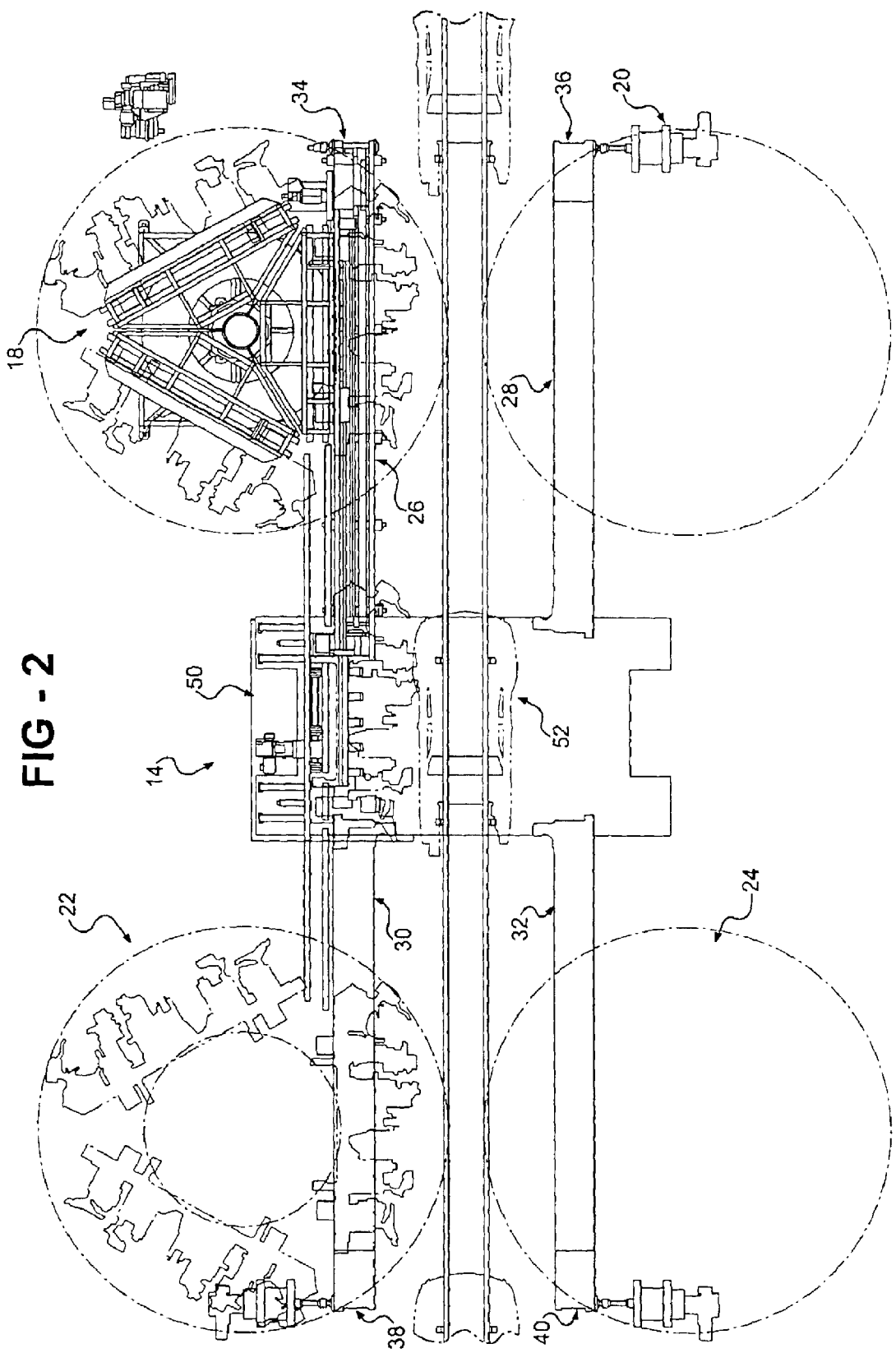
FIG. 2 is a schematic plan view of the body framing system.
Figure 5:
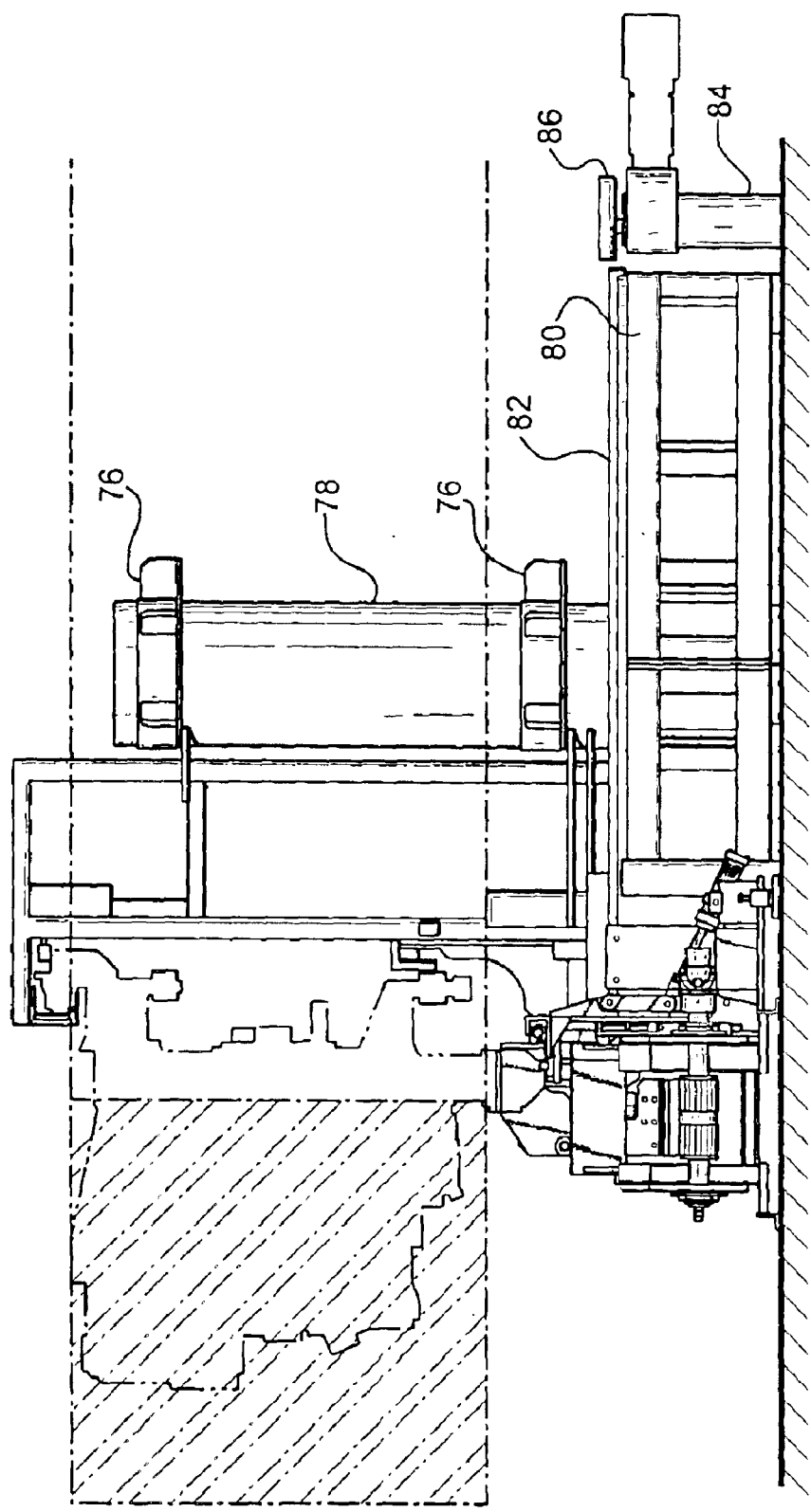
FIG. 5 is a schematic plan view of the carousel of FIG. 4.
Figure 6:
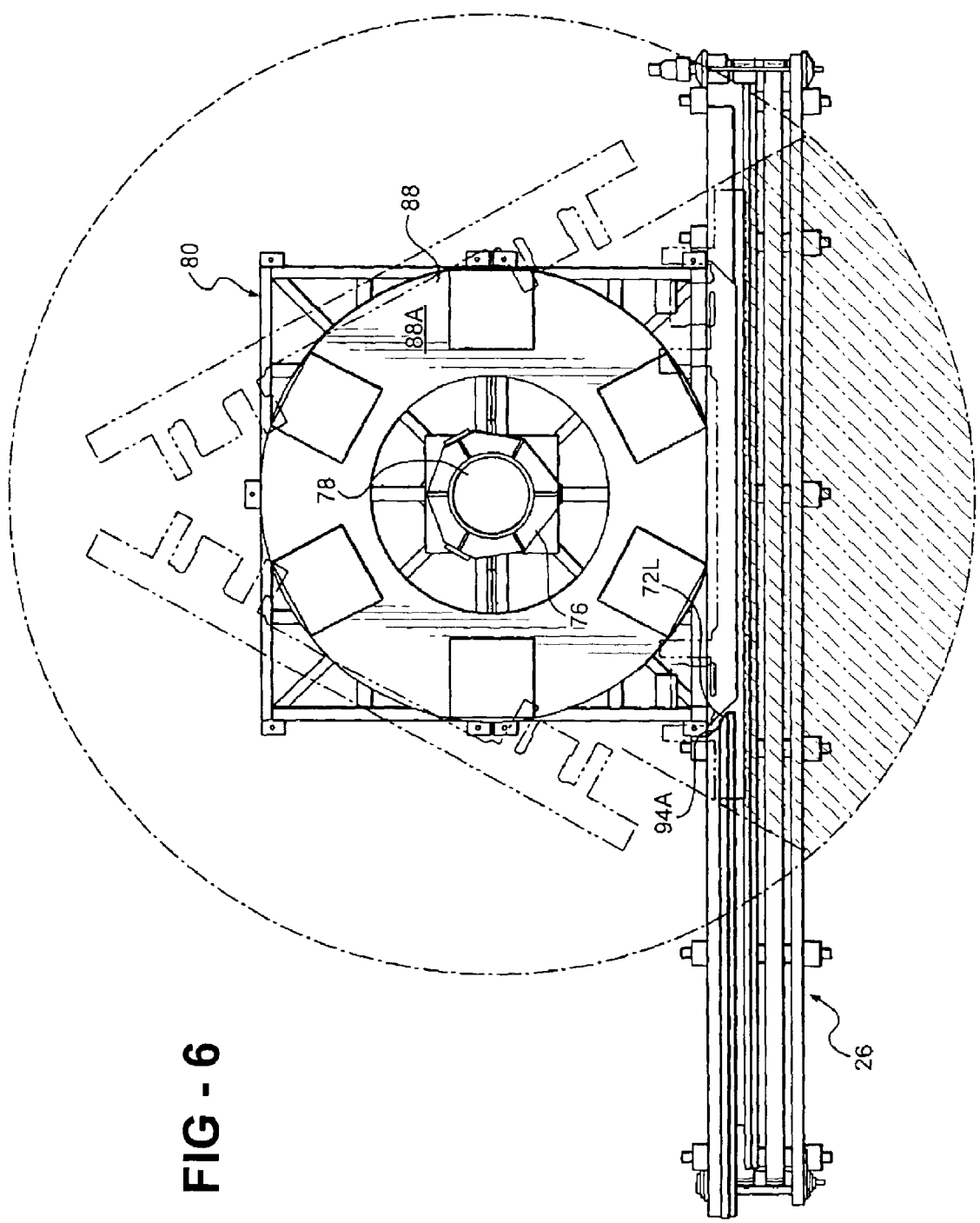
FIG. 6 is a plan view of a carousel base and linear track structure used in the framing system according to the present invention.
Figure 7:
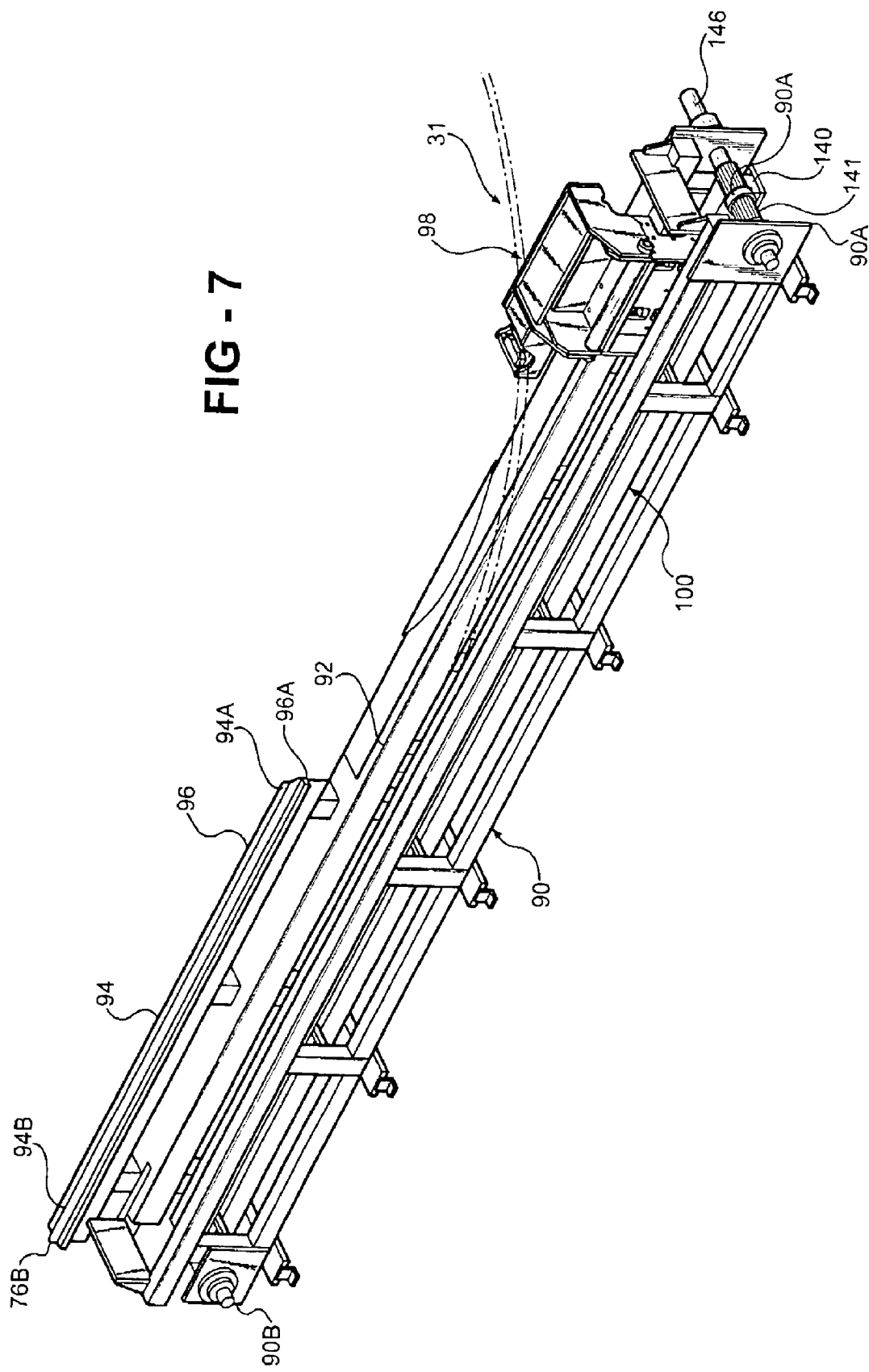
FIG. 7 is a perspective view of the linear track structure.
Figure 8:
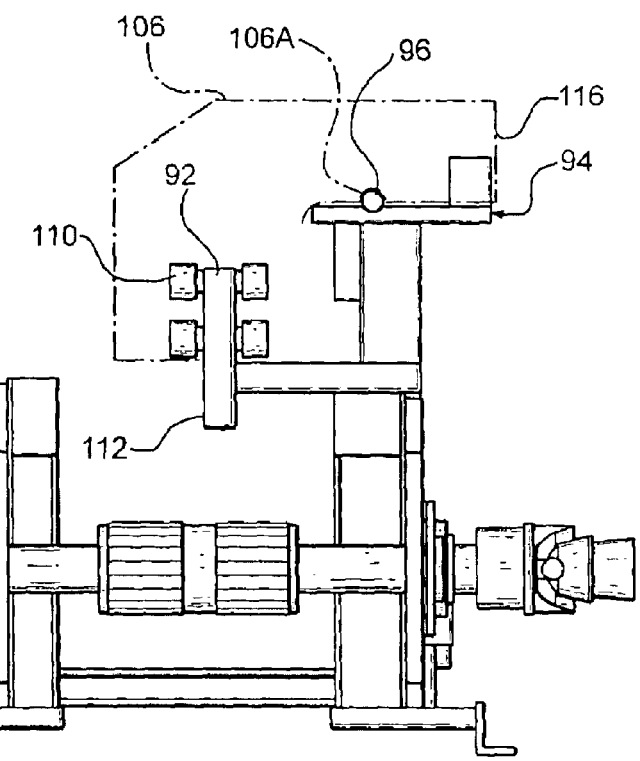
FIG. 8 is a schematic cross sectional view of the track structure.
Figure 19:
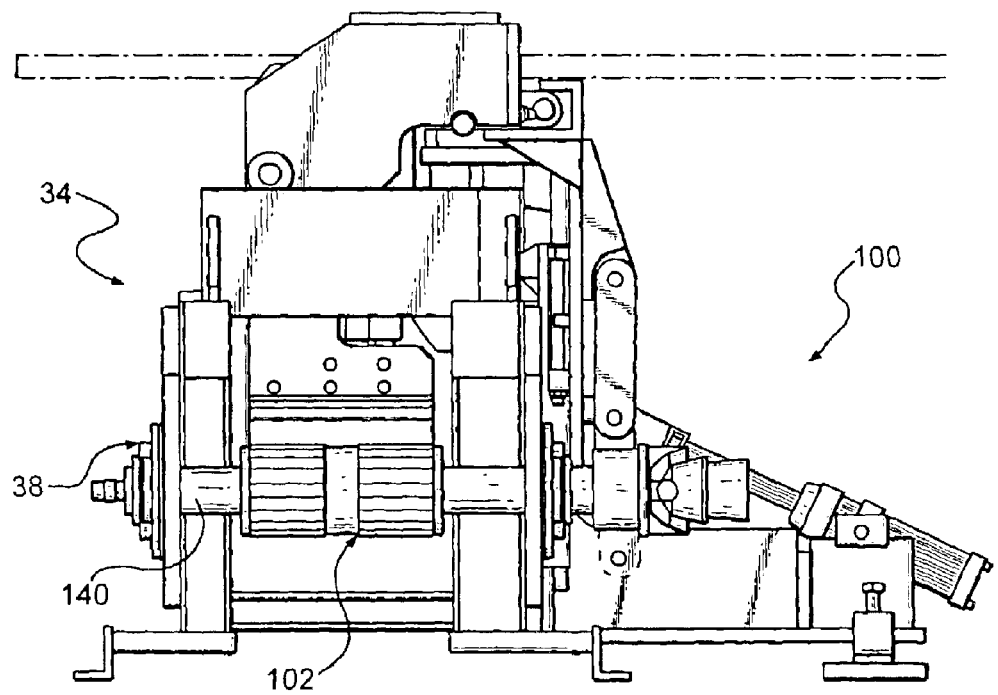
FIGS. 19 and 20 are elevational and perspective views respectively of a trolley assembly used in the framing system according to the present invention.
Figure 9:
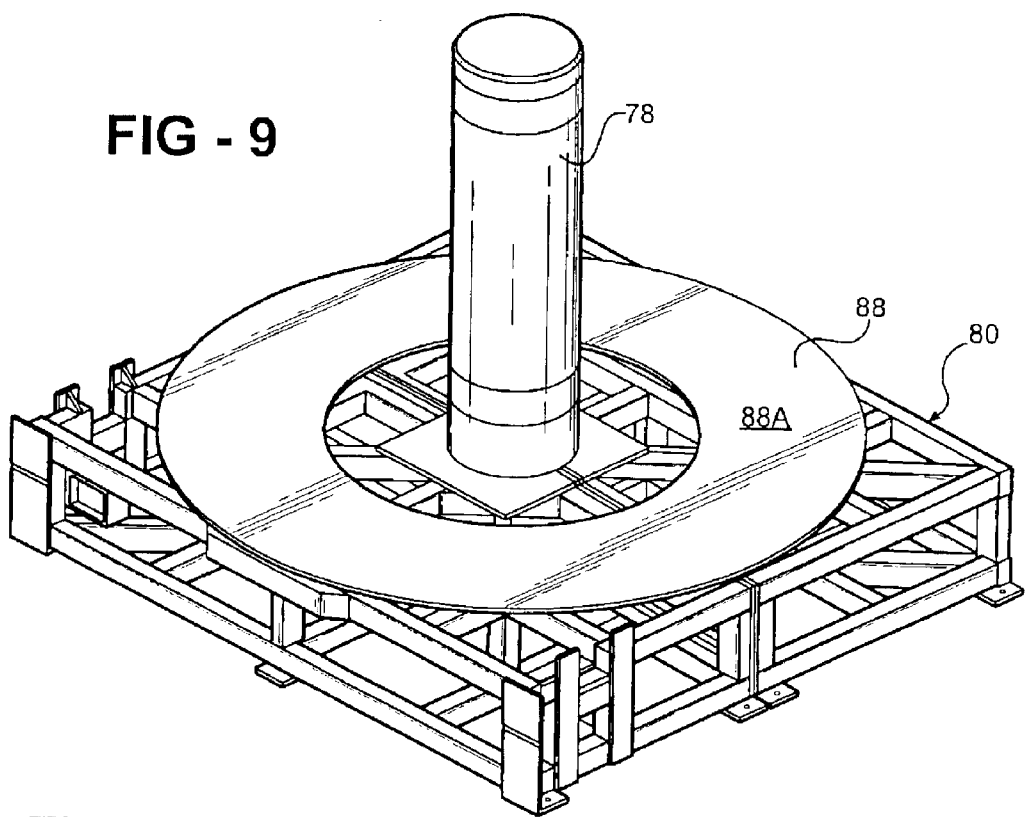
FIG. 9 is a perspective view of the carousel base structure.
Figure 10:
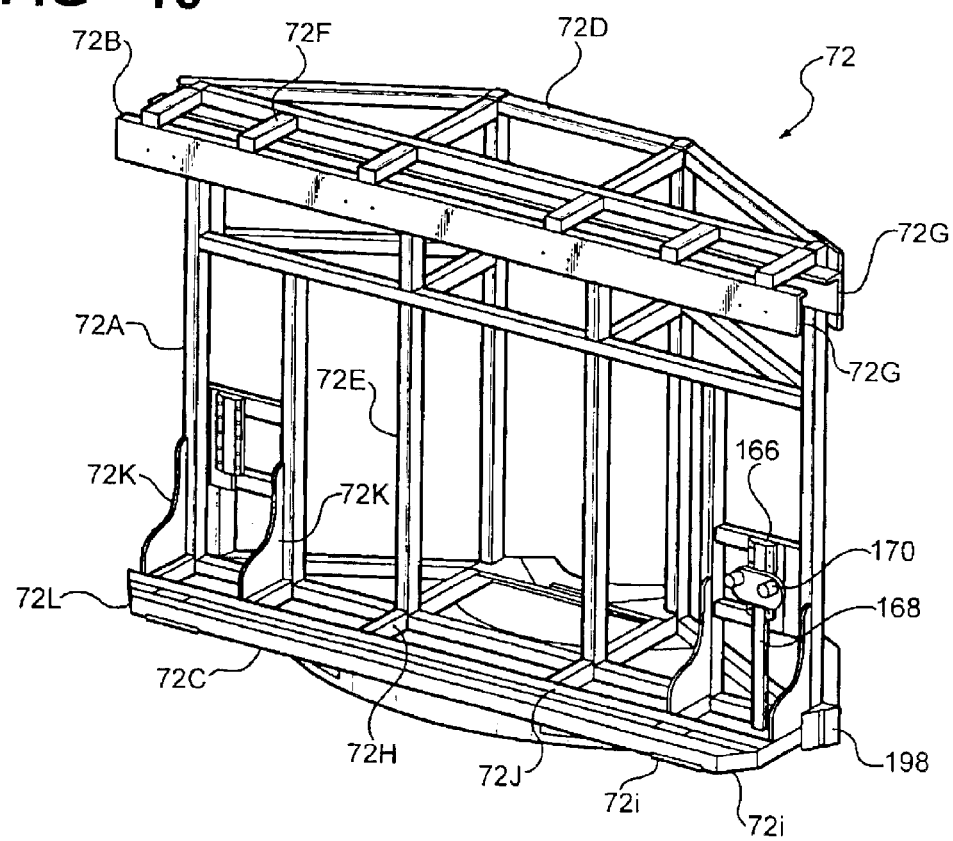
FIG. 10 is a perspective view of a carousel section.
Figure 11:
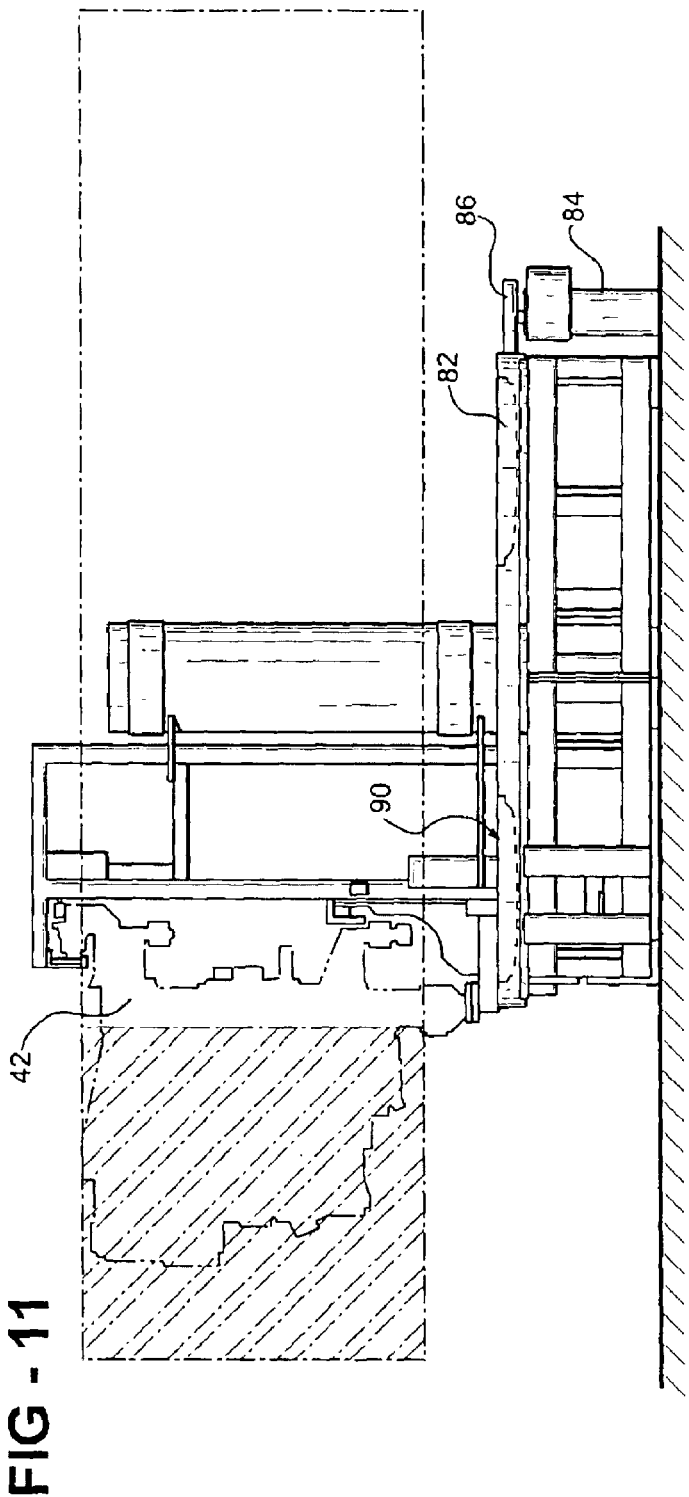
FIG. 11 is a schematic view of a cushion system to facilitate turning of the carousel.

As seen in FIG. 1, the framing system of the present invention is intended for use with a vehicle assembly line 10 in which loosely preassembled vehicle bodies 12 are moved incrementally along the assembly line from station to station, successively loosely preassembled vehicle bodies arrive at a framing station 14 along the assembly line at predetermined build cycle time intervals, and each loosely preassembled vehicle body arriving at the framing station is welded to form a rigid vehicle body. The framing system, broadly considered, (FIGS. 1, 2 and 5) includes framing station 14, a plurality of carousel assemblies 18, 20, 22 and 24; a plurality of linear track structures 26, 28, 30 and 32; a plurality of trolley assemblies 34, 36, 38 and 40; and a plurality of framing gate pairs 42/43, 44/45, 46/47, and 48/49.

Figure 3:
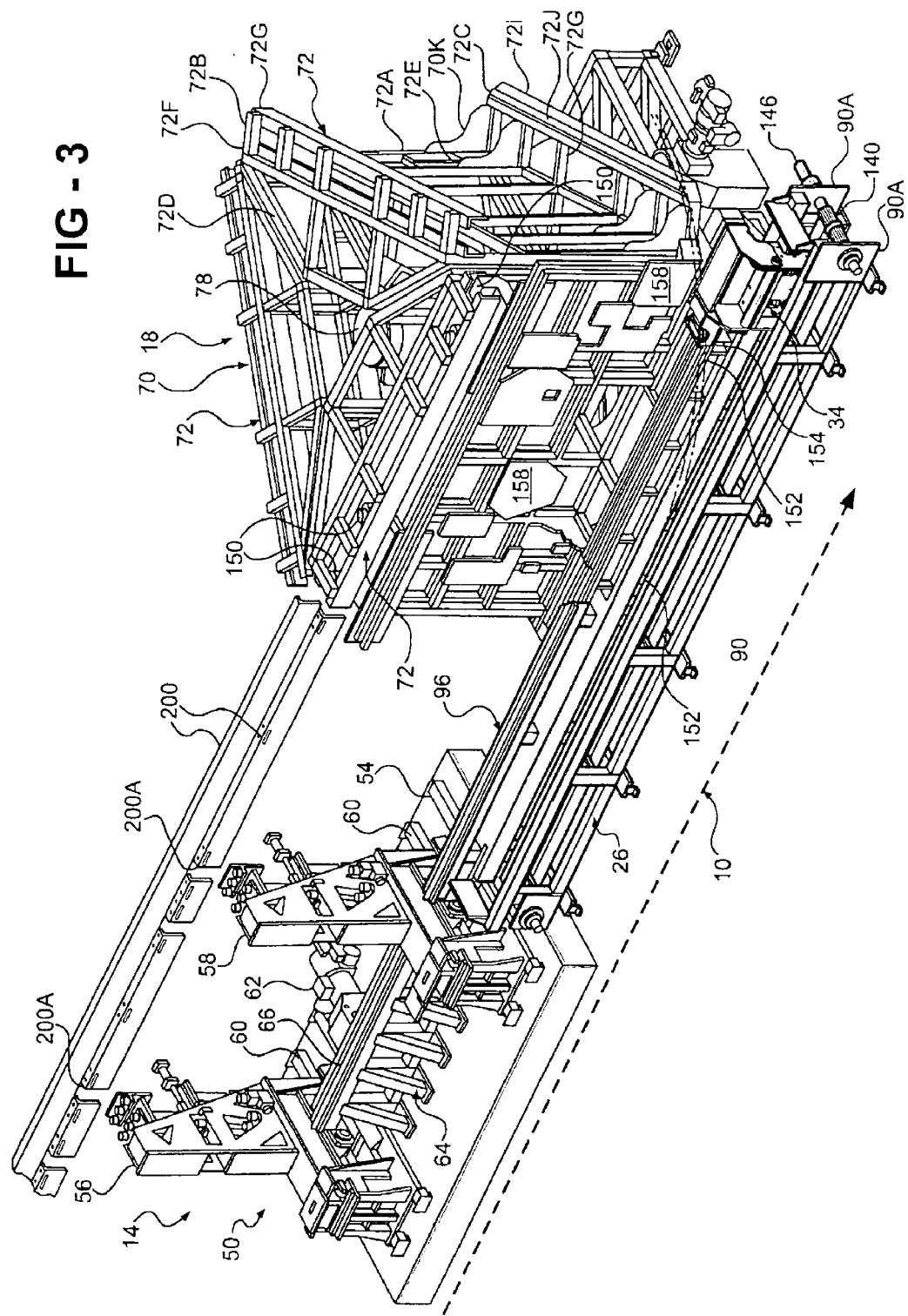
FIG. 3 is a perspective view of a portion of the framing system.
Figure 4:
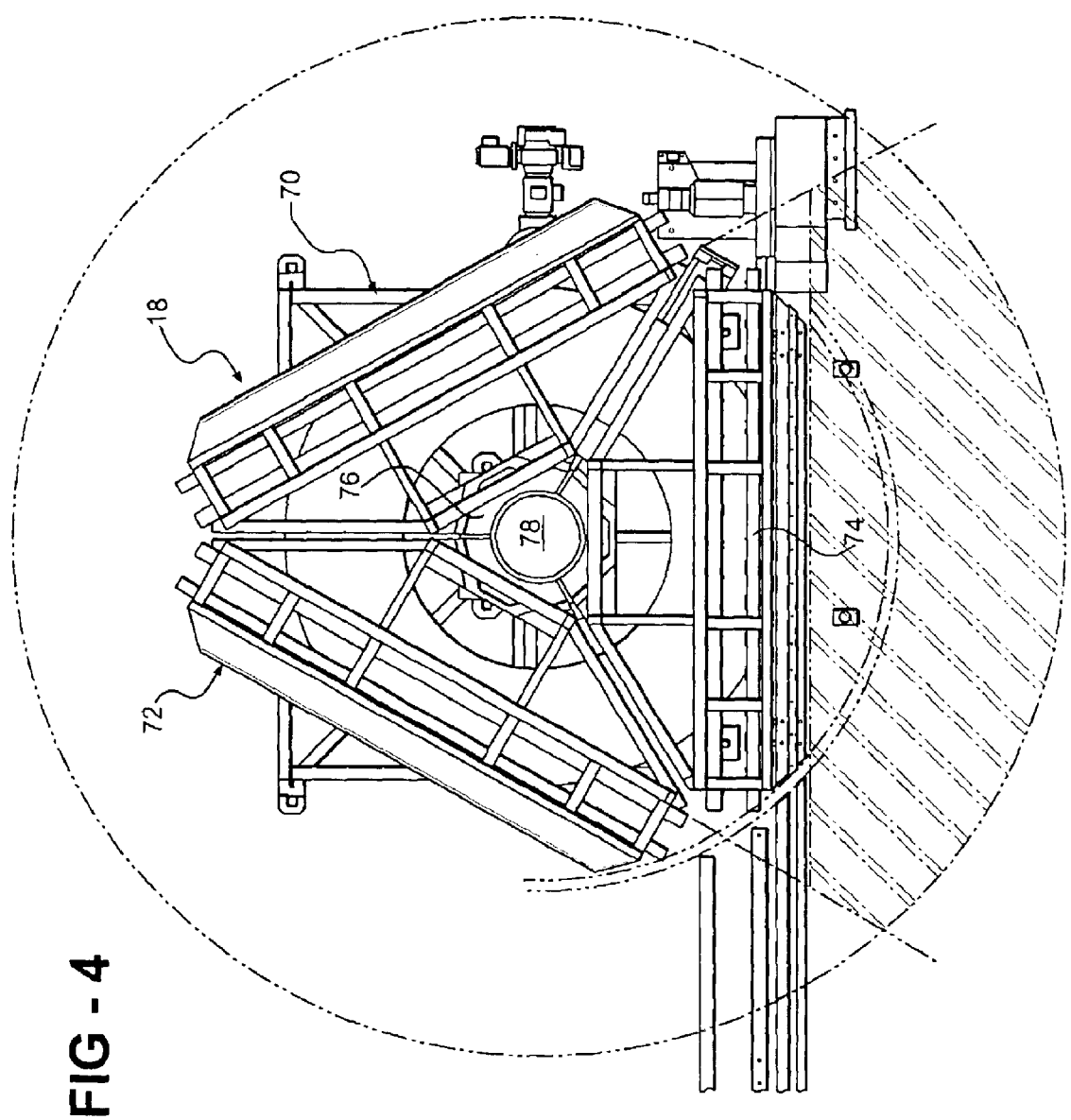
FIG. 4 is a plan view of a carousel used in the framing system.

Framing station 14 includes a first framing station assembly 50 positioned on one side of the assembly line 10 and a second framing station assembly 52 positioned on the opposite side of the assembly line 10 and constituting a mirror image of framing station assembly 50. With reference to FIG. 3, framing station assembly 50 includes a base structure 54 and a pair of axially spaced pillars 56, 58 mounted on tracks 60 and moved by a motor mechanism 62, in unison, between a retracted outboard position to facilitate loading of the framing gates and an inboard position, seen in FIG. 3, proximate the assembly line 10 where framing gates carried by the pillars can clampingly engage a loosely preassembled body 12 prior to the welding operation.

Framing station assembly 50 further includes a track structure 64 positioned between the pillars 56 and 58 and defining a top rail 66, and a plurality of welding guns 68 (FIG. 1) positioned on or proximate the base 54 and arranged to extend in known manner through suitable openings in the framing gates to access the loosely preassembled vehicle bodies 12 clampingly engaged by the framing gates to perform the desired welding operations on the clamped vehicle bodies. Further details of a framing station suitable for use as a part of the invention framing system are described in U.S. Pat. No. 6,173,881 assigned to the assignee of the present invention.

The structure and operation of the framing system will now be described with specific reference to carousel assembly 18, linear track structure 26, and trolley assembly 34. In overview it will be understood that carousel assembly 18, linear track structure 26, and trolley assembly 34 coact to move framing gates upstream along assembly line 10 to framing station assembly 50 from a location on one side of the assembly line; carousel assembly 20, linear track structure 28 and trolley assembly 36 coact to move framing gates upstream to framing station assembly 52 from a location on the opposite side of assembly line 10; carousel assembly 22, linear track structure 30, and trolley assembly 38 coact to move framing gates downstream to framing station assembly 50 from a location on the one side of assembly line 10; and carousel assembly 24, linear track structure 32 and trolley assembly 40 coact to move framing gates downstream to framing station assembly 52 from a location on the opposite side of assembly line.

With reference to FIGS. 2, 3, 4, 10 and 11, carousel assembly 18 includes a carousel body 70 having a triangular configuration constituted by at least two sides or, as illustrated, three identical carousel sections 72 which are configured to be clustered and bolted together to form a three sided or triangulated carousel body. It should be recognized that two sided configurations, similar to that shown schematically in FIG. 29, or four sided configurations, similar to that shown schematically in FIG. 30, or more sides can be provided as desired for the particular assembly without departing from the present invention. Journals 76 positioned at the inner juncture of the clustered and bolted carousel sections 72 are received on an upstanding pivot post or shaft 78 carried by a carousel base structure 80 to mount the carousel body for rotation about the central axis of pivot shaft 78.

Figure 13:
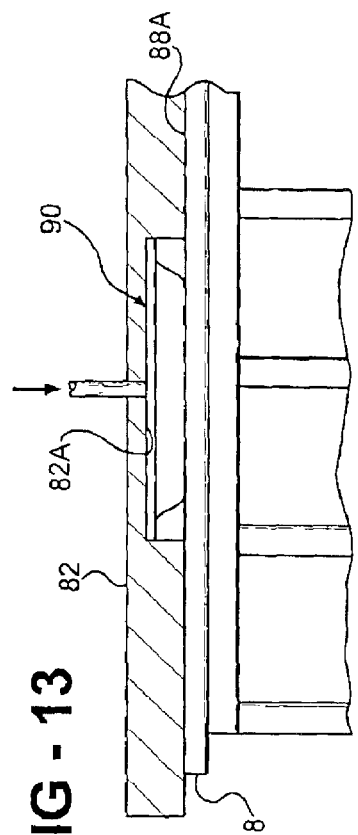
FIGS. 12 and 13 are detailed views of the cushion system.
Figure 12:
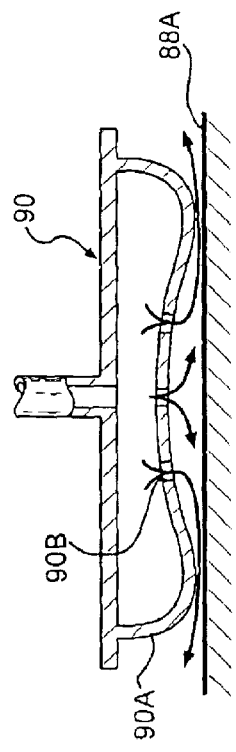

Carousel assembly 18 further includes an annular turn table 82 underlying the carousel body, a servo motor 84 including a pinion gear or tire 86 driving the turntable, and a fixed annular support plate 88 positioned on base 80 in underlying relation to turntable 82 and defining an upper annular support surface 88a. Carousel assembly 18 further includes a plurality of circumferentially spaced air bag assemblies 90 (FIGS. 11, 12 and 13) positioned in downwardly opening cavities 82a in the under face of turntable 82 in overlying relation to support surface 88a of support plate 88. There can be two air bags assemblies underlying each carousel section 72 for a total of 6 circumferentially spaced air bag assemblies underlying the carousel body. It will be seen that when pressurized air is delivered to the air bag assemblies 90 via conduits 92 connected to a suitable source of pressurized air, pressurized air will inflate the diaphragm 90a of each air bag and the pressurized air will flow through apertures 90b in the lower wall of the diaphragm and flow radially outwardly, as seen by the arrows in FIG. 12 to create an air film or cushion beneath the diaphragm 90a. This inflating action of the air bags has the effect of raising the carousel body 70 on the post 78 off of support surface 88a with the upward movement of the carousel body permitted and defined by sliding movement of annular bearings 76 on post 78, and has the further effect of creating an air film between the carousel body and the support surface 88a so that the motor 84 via the pinion gear or tire 86 and turntable 82 can readily turn the carousel body to bring successive sides of the carousel body into proximity and alignment with assembly line 10. Each carousel frame section 72 has a generally lattice configuration (FIG. 10) including a vertical rectangular main body portion 72a, an upper track structure 72b, a lower track structure 72c, and a connector structure 72d. Main body 72a can be formed for example of a series of spaced vertical post members 72e; upper track structure 72b can be formed of a series of spaced horizontal post members 72f supporting a pair of laterally spaced longitudinally extending angle irons 72g; and lower track structure 72c can include a plurality of spaced horizontal post members 72h supporting an apron track 72i which in turn supports a roundbar guide rod 72j. A plurality of spaced saddle gussets 72k interconnect the main body 72a and lower track structure 72c. Connector structure 72d is configured to meet with the connector structure 72d of the remaining carousel sections in jigsaw puzzle fashion to form the triangular configuration of the carousel clustered about central post 78. Carousel assemblies 20, 22 and 24 are identical to the described carousel assembly 18.

Figure 29:
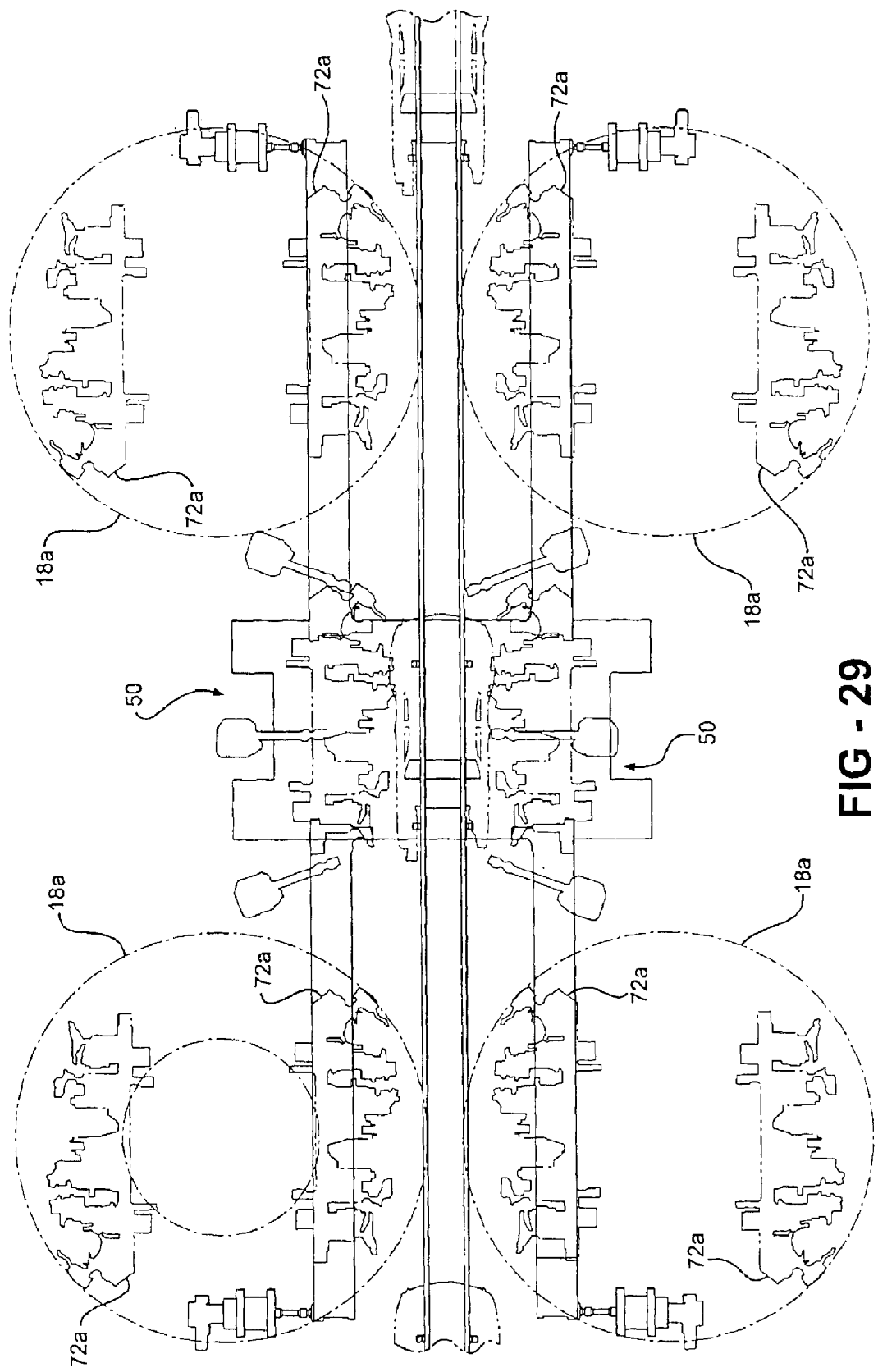
FIG. 29 is a simplified schematic view of a carousel according to the present invention having two sides.
Figure 30:
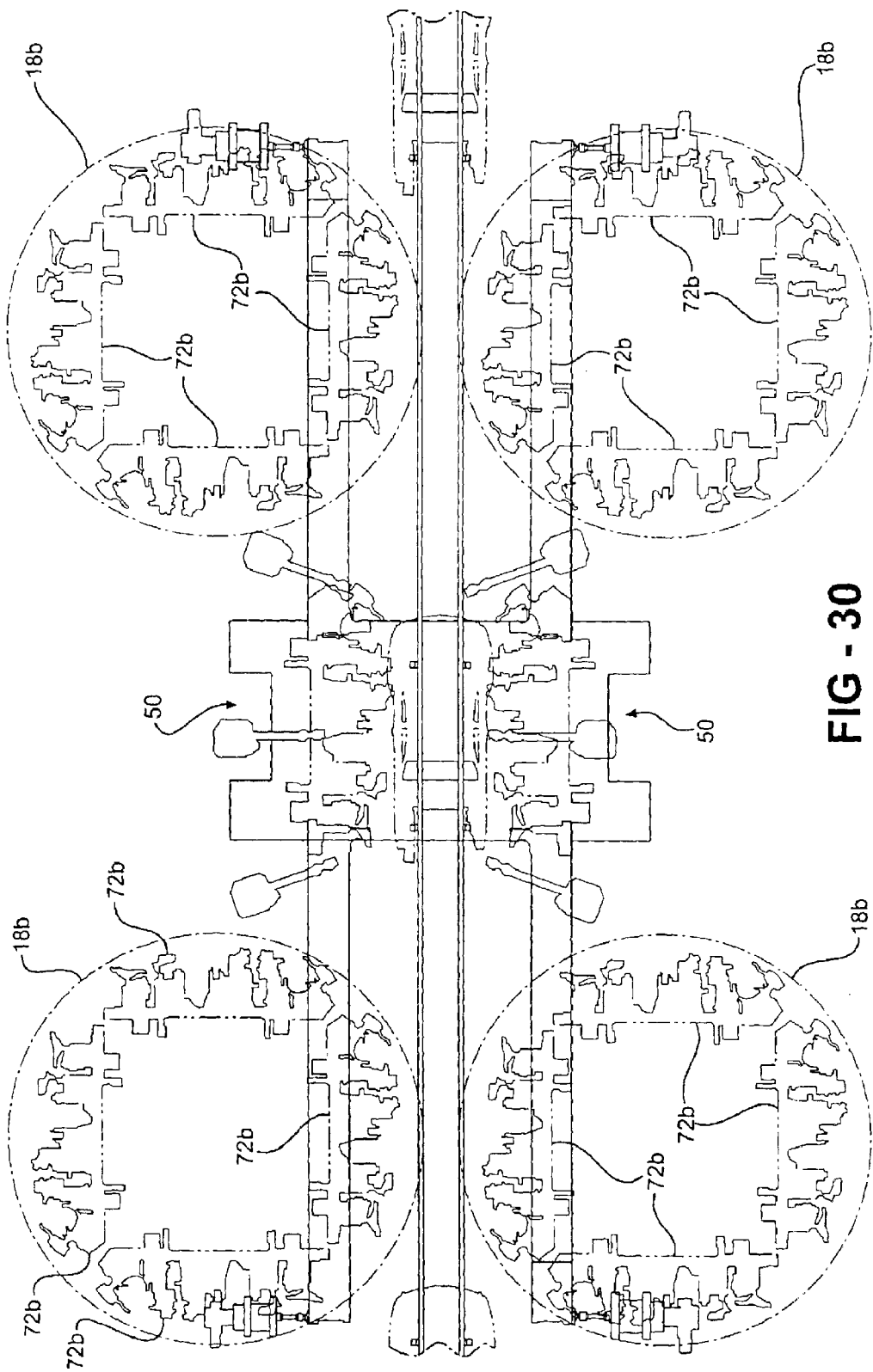
FIG. 30 is a simplified schematic view of a carousel according to the present invention having four sides.

Referring now to FIGS. 29 and 30, the illustrated carousel assemblies 18a, 18b respectively are identical in operation and function to the previously described carousel assembly 18 with the exception of having two sides or carousel sections 72a, and four sides or carousel sections 72b respectively for receiving and delivering framing gates to the framing station assembly 50. It should be recognized that the carousel assembly can have at least two sides according to the present invention, and can include three sides, or four sides, or more four sides, depending on the particular framing station assembly to be supplied with framing gates, as well as other considerations, such as available floor space and flexible changeover requirements for the assembly line.

Linear track structure 26 is arranged for coaction with carousel assembly 18 and specifically is arranged to deliver framing gates from carousel assembly 18 to framing station assembly 50. Track structure 26 (FIGS. 3, 6, 7 and 8) includes a belt shuttle frame 91, a vertical guide track 93, a horizontal guide track 94, and a roundbar rail 96. Belt shuttle frame structure 91 has a generally tubular steel frame construction and defines an overall cage configuration. Vertical guide track 93 is supported on belt shuttle frame structure 91 in overlying relation to the belt shuttle frame structure and runs the full length of the track structure. Horizontal guide track 94 is supported on the belt shuttle frame structure 91 in a position above and laterally of vertical guide rail 93 and extends from a first end 96a at a location intermediate the track structure to a second end 96b proximate the framing station assembly 50. Roundbar rail 96 is fixedly secured to the upper face of track 96 and is coextensive with the track, extending from a location 96a intermediate the track structure to a location 96b proximate framing station assembly 50. Track structure 32 is identical to track structure 26; track structure 28 is a mirror image of track structure 26; and track structure 30 is identical to track structure 28.

Trolley assembly 34 (FIGS. 7, 19, 20, 22 and 23) includes a trolley 98, a lift mechanism 100, and a shuttle belt assembly 102. Trolley 98 is intended to move slidably along the track structure 26 while conveying a framing gate from the carousel to the framing station. Trolley 98 includes a lower base member 104 and an upper dump member 106. Base member 104 includes lower clamping plates 108 and further defines a plurality of rollers 110 configured to rollably engage opposite side faces of vertical track 92 as the trolley moves along the track structure. Base 104 further includes rollers 112 adapted to rollably engage the lower edge of guide rail 92 as the trolley moves along the track structure. Dump member 106 defines an arcuate semicircular cut out 106a for coaction with roundbar rail 96 and further includes rollers 114 for coaction with lifter mechanism 102, and cam follower rollers 116 for rollable engagement with the upper face of horizontal guide track 94. Dump member 106 is pivotally mounted on base member 104 by a pivot shaft 118 and includes a receiver section 106b including a cut out 106c and carrying spaced pilot plates 120 defining a notch or a slot 122 therebetween for receipt of a gate dog member carried by a framing gate.

Figure 21:
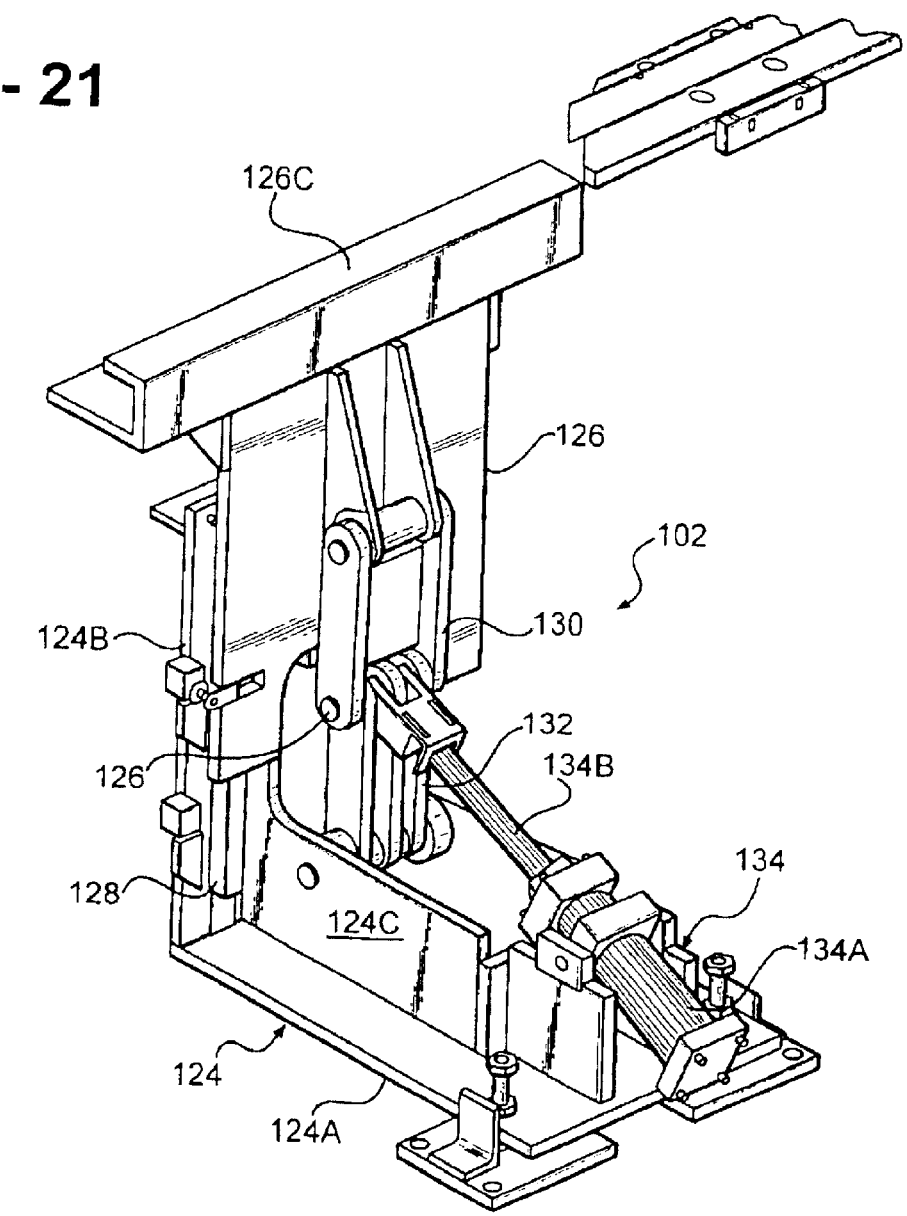
FIG. 21 is a perspective view of a lift mechanism forming a part of the trolley assembly.
Figure 27:
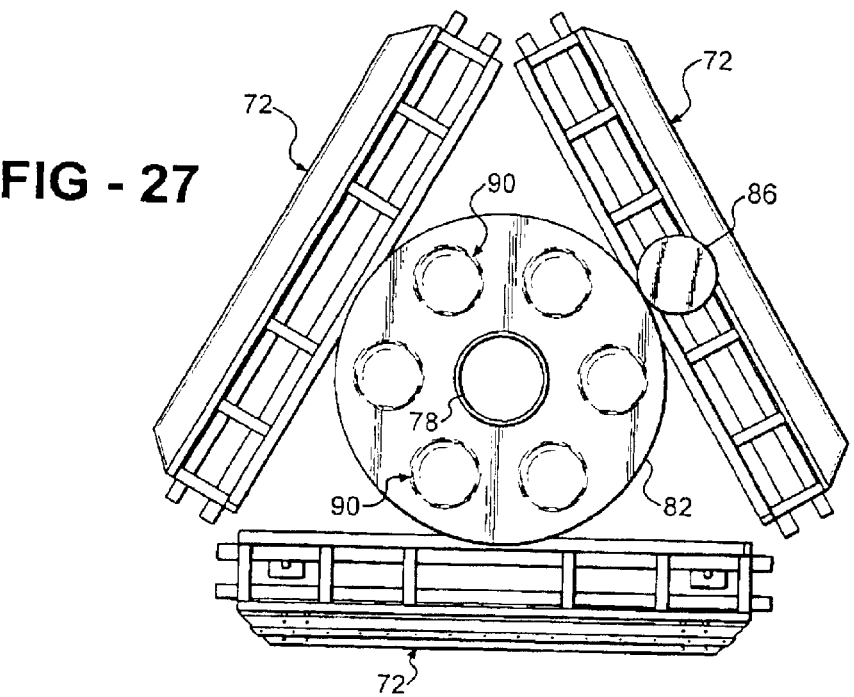
FIG. 27 is a schematic view of a carousel assembly.
Figure 22:
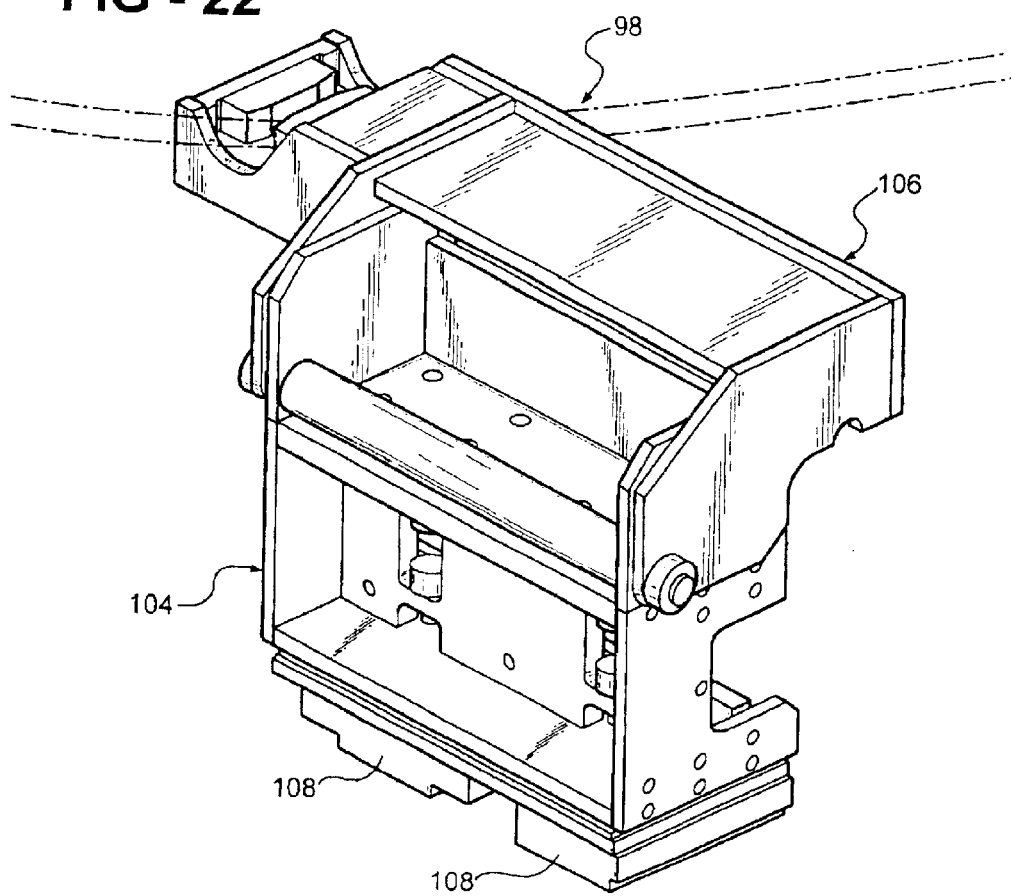
FIGS. 22 and 23 are perspective views of a trolley forming a part of the trolley assembly.
Figure 23:
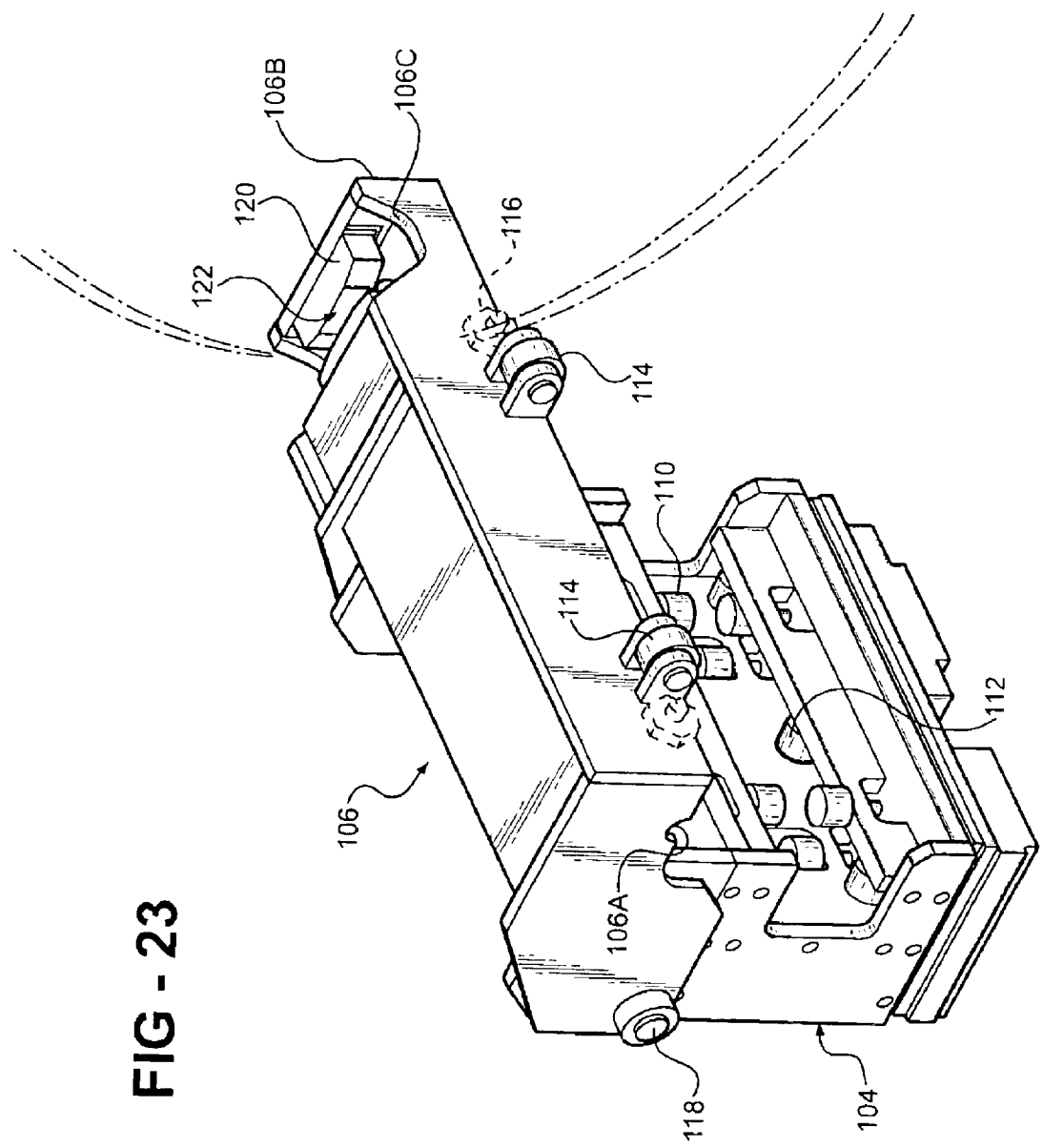

Lift mechanism 100 is intended to pivotally move dump member 106 about the axis of pivot 118 between a raised position in which the notch 122 can engage the gate dog on a framing gate and a lowered position in which the gate dog is released and the gate is free to move relative to the trolley. Lift mechanism 100 (FIGS. 19, 20 and 21) includes a frame structure 124 (including a horizontal base plate portion 124a, a vertical plate portion 124b and spaced vertical plate portions 124c); a vertical slide plate 126 mounted for vertical sliding movement on vertical plate portion 124b by linear bearings 128 and including at its upper end a U-shaped receiver portion 126a receiving the rollers 114 of the dump member 106 of the trolley; a toggle mechanism including a first upper toggle link 130 pivotally connected at its upper end to slide plate 126 and a second lower toggle link 132 pivotally connected at its lower end to vertical plate portions 124c, and an air cylinder 134 including a cylinder 134a pivotally mounted between plate portions 124c and a piston rod 134b pivotally mounted at its free end to the pivotal connection at 136 between the lower end of the upper toggle link 130 and the upper end of lower toggle link 132. It will be seen that actuation of air cylinder 134 has the effect of opening and closing the toggle movement and thereby sliding vertical slide bracket 126, including the upper receiver portion 126a, up and down to thereby (by virtue of the capture of rollers 114 in receiver portion 126a) pivot the dump member 106 of the trolley about the axis of pivot shaft 118 and move the pilot plates 122 into and out of engagement with the framing gate dog.

Shuttle belt assembly 102 (FIGS. 3, 6, 7 and 19) includes a powered pulley 140 mounted between spaced plates 91a proximate the downstream end of belt shuttle frame structure 91; an idler pulley 142 mounted between spaced plates 91b proximate the upstream end of belt shuttle frame structure 91; a pair of toothed endless belts 144 arranged in endless fashion around pulleys 140 and 142; and a servo motor 146 drivingly connected to powered pulley 140 and operative to drive the pulley and thereby drive the toothed endless belts 144. Belts 144 are fixedly secured to the underface of trolley base member 104 using clamping plates 108 whereby actuation of servo motor 146 has the effect of moving trolley 98 along track structure 26 from the downstream end of the structure to the upstream end of the structure. As the trolley moves along the track structure, rollers 110 engage opposite side faces of vertical guide rail 92 and rollers 112 engage the lower edge of guide rail 92 to guide the movement of the trolley along the track structure. Trolley assembly 40 is identical to trolley assembly 34; trolley assembly 36 is a mirror image of trolley assembly 34; and trolley assembly 38 is a mirror image of trolley assembly 40.

Figure 14:
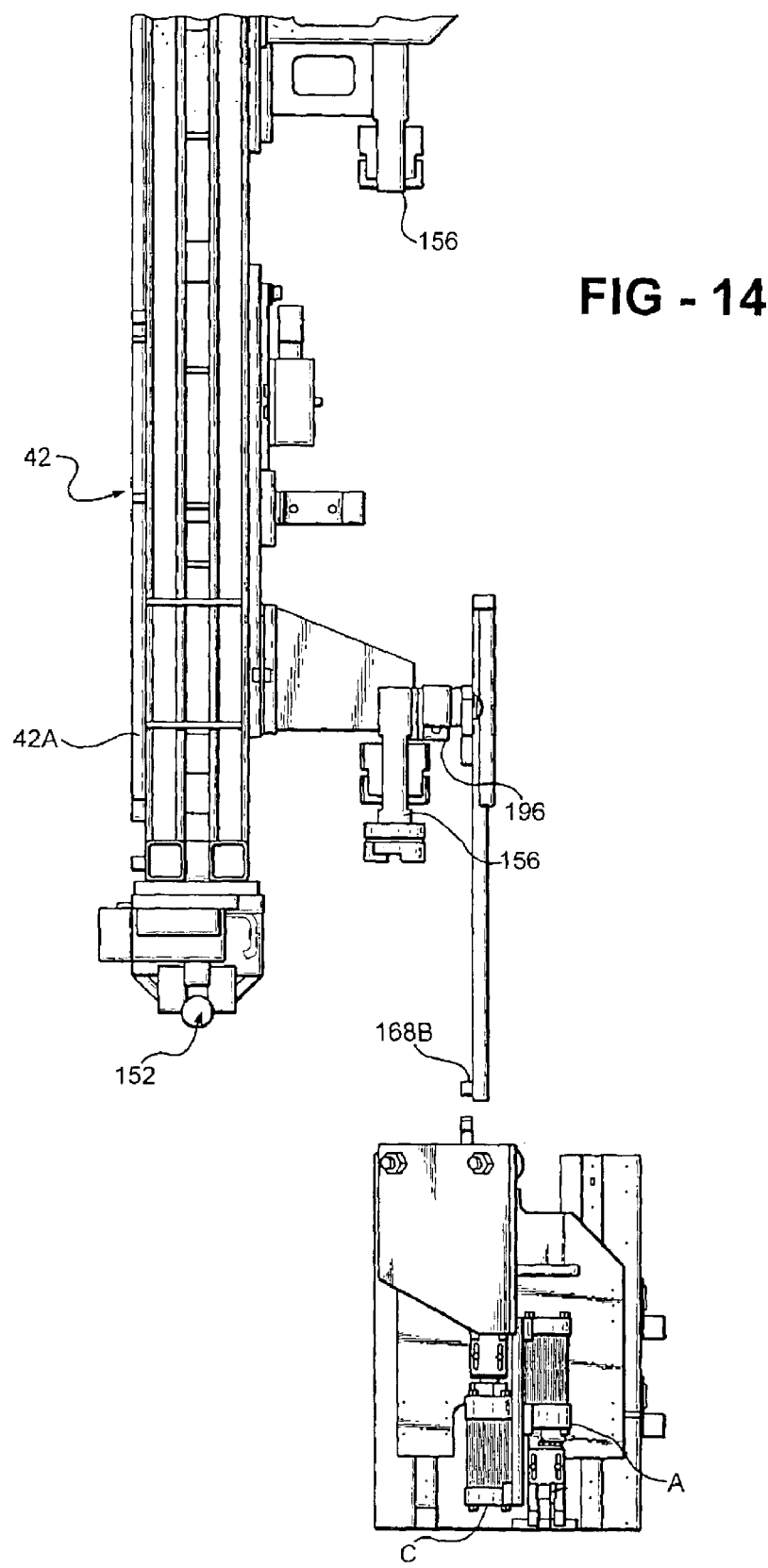
FIGS. 14 and 15 are end and perspective views respectively of a latch release mechanism used in the framing system according to the present invention.
Figure 15:
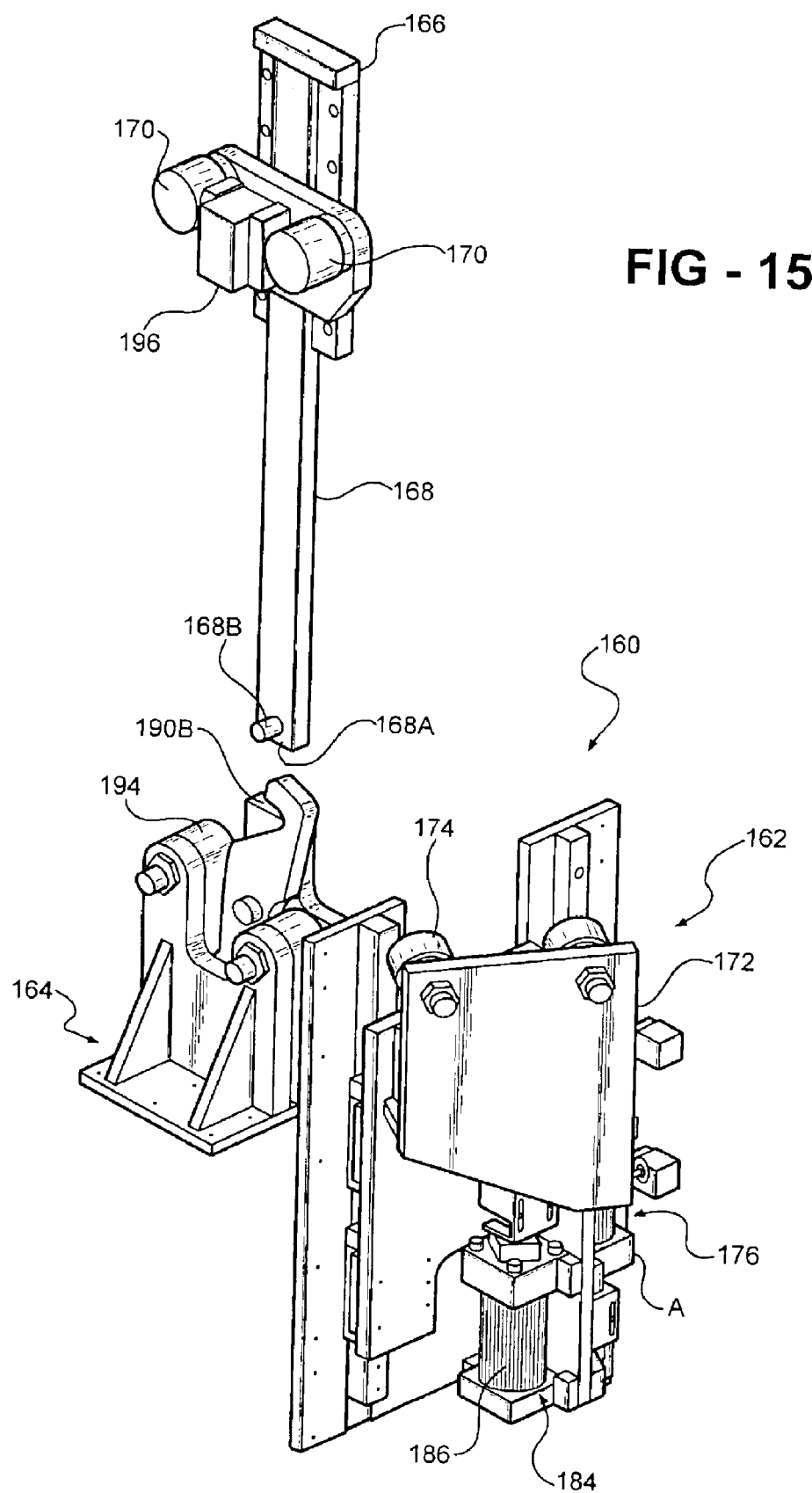

Framing gate 42 will now be described in detail. It will be understood that the remaining framing gates have a similar construction but will differ from each other with respect to tooling, clamps, etc. carried by the gate since the clamps and tooling will be peculiar to the particular motor vehicle body style for which the gate is designed. Framing gate 42 (FIGS. 3, 11 and 14) has a generally rectangular lattice configuration and a generally tubular steel frame construction. The upper edge of the gate includes a plurality of guide rollers 150 for rollably guiding in the angle irons 72g of a respective upper track of a respective carousel; a pair of axially spaced bearing structures 152 on the lower edge of the gate rollably guiding on the roundbar guide rail 72j of a respective lower track of a respective carousel; and a gate dog 154 along the lower edge of the gate for coaction with the notch 122 of the dump member of the respective trolley 98. Bearings 152 can be of the "caterpillar" type capable of crawling along the rounbar guide rail 72j and capable of jumping the gap between the roundbar guide rail 72j and the roundbar guide rail 96 of the associated linear track structure as the gate is moved along the track structure by the trolley. Bearings 152 can, for example, be of the type shown in FIGS. 24, 25 and 26, available from Thompson Industries, Inc., as part number RW-1 WA. Gate 42 further includes finger members 156 projecting downwardly at the rear face of the gate in rearwardly spaced relation to the main body structure 42a of the gate. Fingers 156 facilitate the engagement of the gate with the pillars 56, 58 after arrival of the gate at the framing station in a manner more fully described in U.S. Pat. No. 6,173,881 B1 assigned to the assignee of the present application. Specifically, the fingers 156 coact with the pillars 56 and 58 in the manner shown and described with reference to FIG. 13 of U.S. Pat. No. 6,173,881 or in the manner shown and described with reference to FIG. 20 of that patent. Gate 42 will be seen to define a plurality of mounting plates 158 positioned on the main body 42a of the gate in selected positions and in various configurations with respect to the gate. It will be understood that these mounting plates are for use in mounting tooling and clamping components on the gate for use in clamping the loosely preassembled body at the framing station prior to the welding operation. It will be further understood that a pair of gates (42, 43, for example) would be used in clamping the loosely preassembled vehicle body at the framing station from opposite sides of the assembly line and that each pair of framing gates (42, 43; 44, 45; 46, 47; and 48, 49) would include mounting plates and tooling and clamping components peculiar to the body style corresponding to the respective pair of framing gates.

Figure 16:
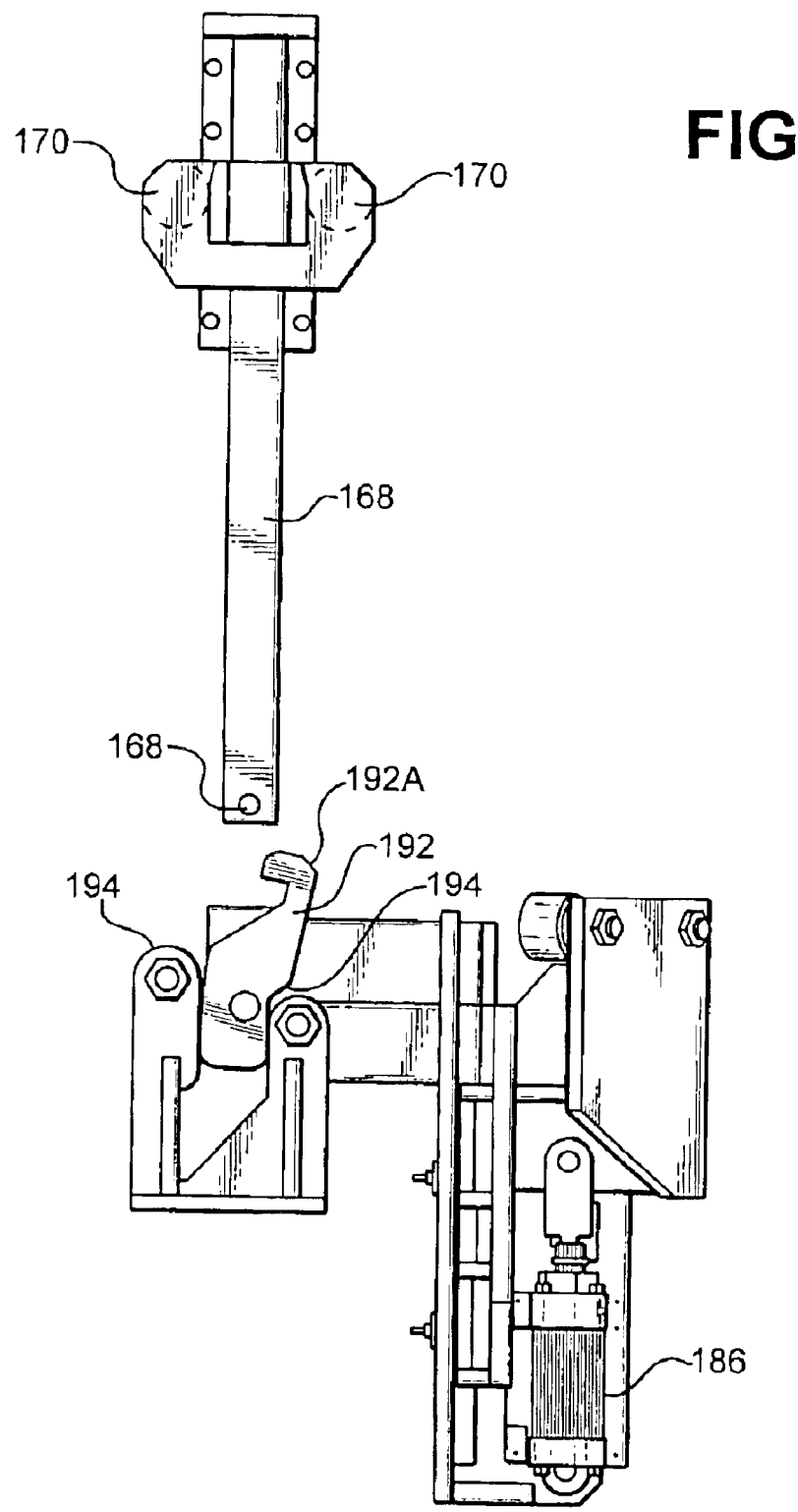
FIGS. 16, 17 and 18 are further detailed views of the latch release mechanism.
Figure 18:
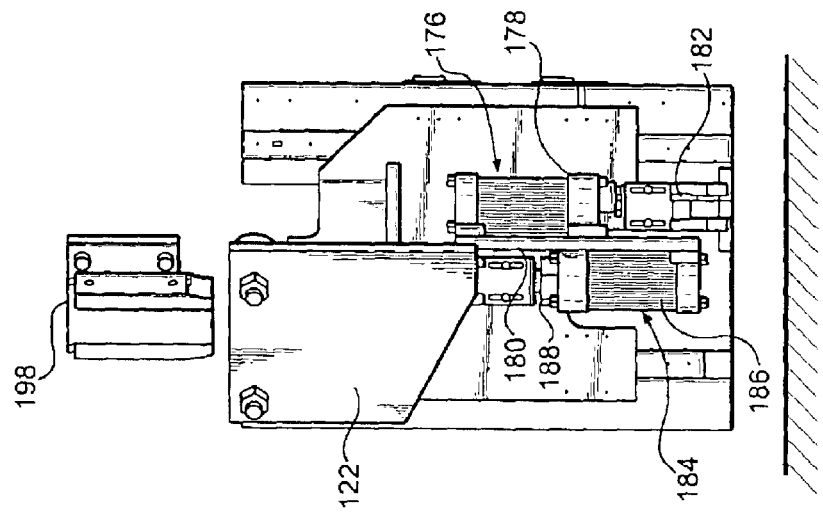
Figure 17:
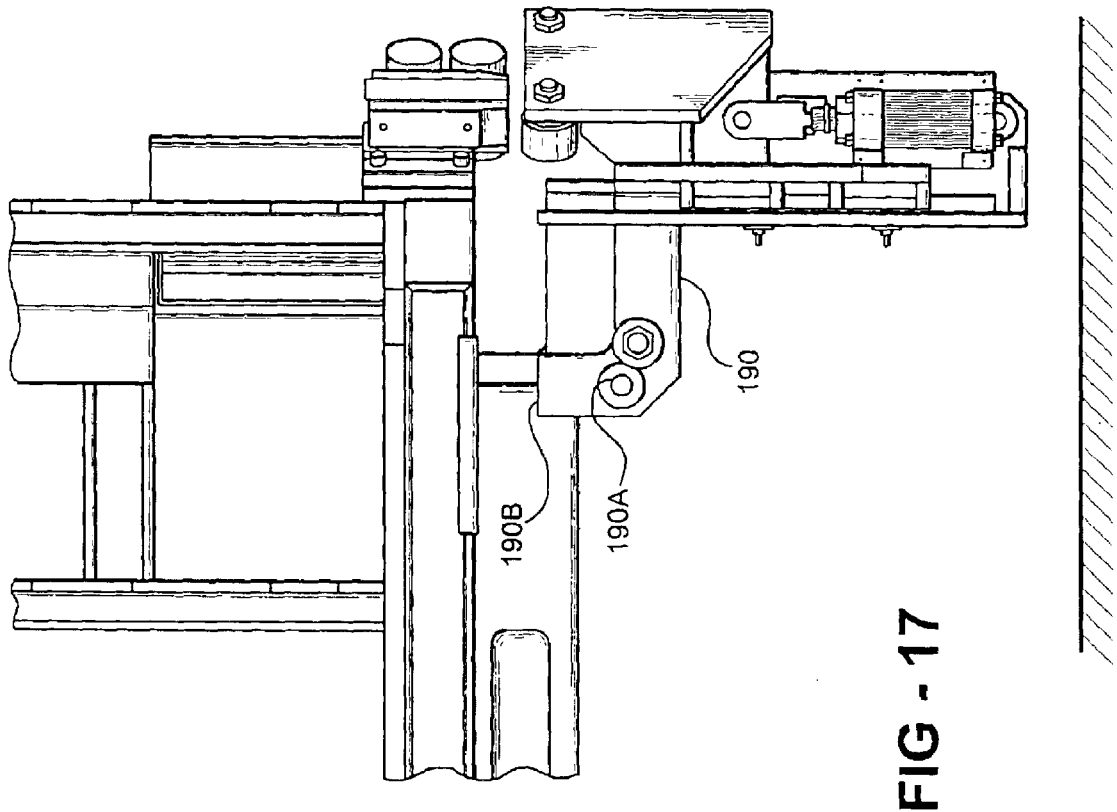
Figure 20:
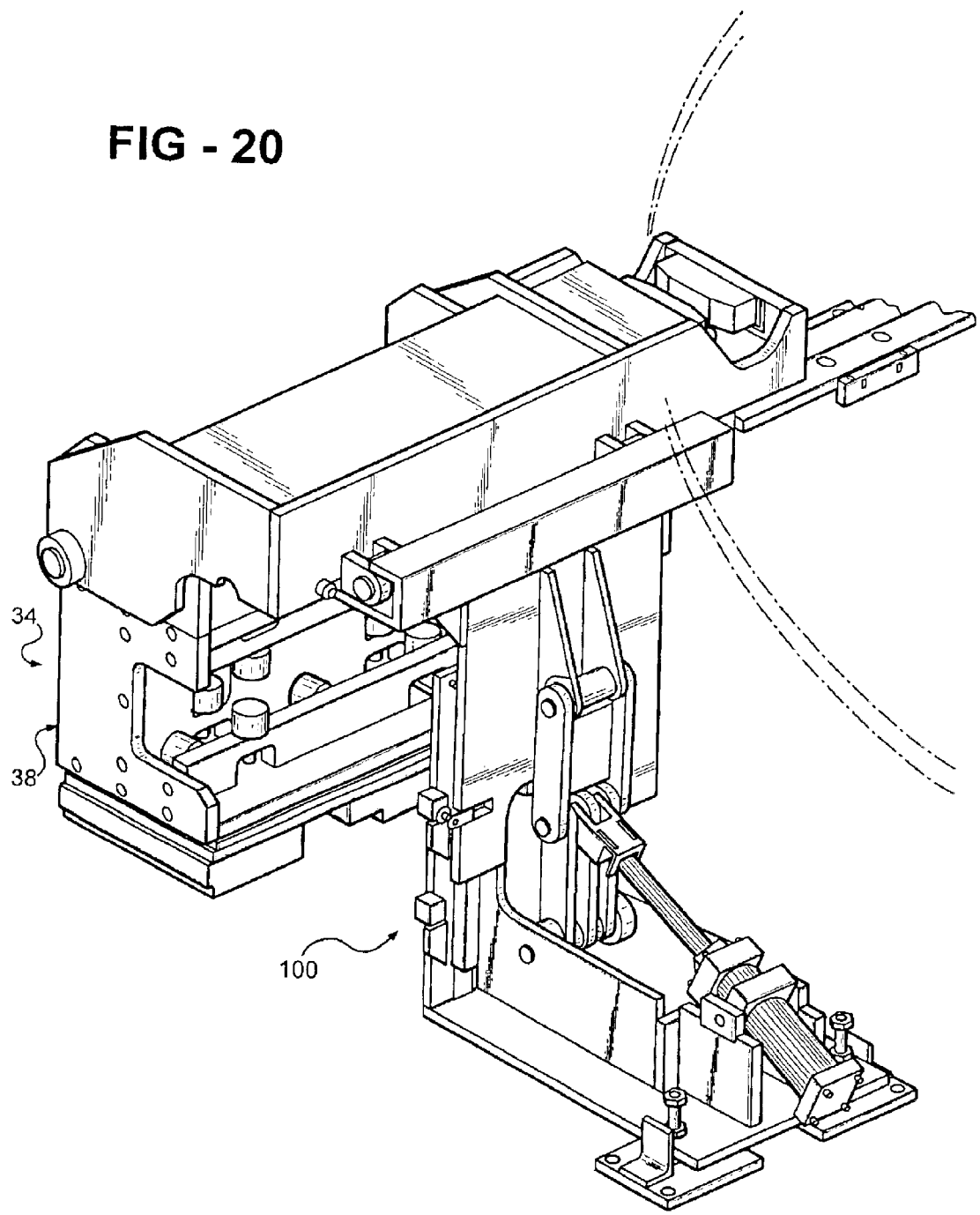

The invention framing system further includes a latching device for latching and unlatching a gate to the carousel and a latching device for latching and unlatching the carousel to the base structure. For reasons of compactness and servicing, these two latching functions are combined in a single combined latch assembly 160, seen in FIGS. 14–18. Combined latch assembly 160 includes a base structure 162 that is adapted to be fixedly secured to a carousel base structure 80 at a location proximate a corner of the carousel base structure; a further base structure 164 adapted to be fixedly secured to the carousel base structure proximate base structure 162; a jib slide structure 166 adapted to be fixedly secured to the carousel body proximate each corner of the carousel body; a T-bar slide 168 slidably mounted in each jib slide and including spaced rollers 170 at the upper end of the slide; a plate slide 172 mounted for vertical sliding movement on the base plate 162 and including spaced rollers 174 proximate an upper edge of the slide plate; an air cylinder 176 including a cylinder 178 mounted on a piggy back plate 180 with the free end of piston rod 182 pivotally mounted to a lower edge of base plate 162; an air cylinder 184 including a cylinder 186 mounted on piggy back plate 180 and with the free end of piston rod 188 pivotally secured to the slide plate 172; an L-shaped lift bar or arm 190 fixedly secured at one end to slide plate 172 and terminating in a vertical tip portion 190a; a finger 192 pivotally mounted on lift bar 190 proximate tip portion 190a and including a hook shaped upper portion 192a; and a pair of cam rollers 194 mounted on base member 164 and slidably and cammingly engaging opposite edge surfaces of finger 192. Latch assembly 160 is intended for selective coaction with a precision dog 196 provided on the rear face on each framing gate and a locator block 198 provided at each corner of the carousel body. In overview, rollers 174 are sized to coact with block 198 to lock the carousel body to the carousel base structure and rollers 170 are sized to coact with precision dog 196 to lock a framing gate to a respective side of the carousel body. Specifically, as the carousel body is turned to bring one side of the carousel body into alignment with the assembly line, cylinder 176 is fired to move plate slide 172 upwardly on base plate 162 (carrying the cylinder 186 with it in piggyback fashion) to move rollers 174 into straddling relation with the locator block 198 proximate the respective side of the carousel. This upward sliding movement of plate 172 has the effect of bringing the top edge 190b of arm 190 into engagement with the lower end 168a of T-bar slide 168 without upwardly displacing the slide thereafter the cylinder 186 is fired to move slide 172 further upwardly, while retaining locking engagement between rollers 174 and precision block 198, to raise the T-bar slide 168 and disengage rollers 170 from precision dog 196 to unlatch the framing gate from the carousel body. As T-bar slide 168 is moved upwardly by arm 190, cams 194 operate to move the hooked portion 192a of finger 192 into overlying relation with a peg 168b on the lower end of slide 168. When cylinder 184 is thereafter fired to re-engage rollers 170 with precision dog 196 to re-establish a latched connection between the respective framing gate and the carousel body, rollers 170 are moved downwardly in a positive manner by the positive pulling action of hook portion 192a on peg 168b, rather than relying on gravity to accomplish the latching movement of the slide 168. Following firing of cylinder 184 to positively move the rollers 170 into latching engagement with the precision dog on the respective framing gate, the cylinder 176 can be fired to further lower slide 172 to disengage rollers 174 from locator 198 to unlatch the carousel body from the carousel base structure to allow turning movement of the carousel body to bring a new framing gate into alignment with the assembly line. As plate slide 172 moves downwardly to disengage rollers 174 from locator block 198, cams 194 selectively engage the opposite edges of finger 192 to allow the finger to rotate outwardly and move downwardly to the disengaged position seen in FIG. 16 preparatory to a new unlatching operation of a respective framing gate.

OPERATION

In the overall operation of the framing system of the invention, the four carousel assemblies 18, 20, 22 and 24 and the four linear track structures 26, 28, 30 and 32 coact to bring selected pairs of framing gates to the framing station for use in clamping the opposite sides of a loosely preassembled vehicle body preparatory to the welding operation. With particular reference to carousel assembly 18 and linear track structure 26, the carousel body can be selectively rotated to bring each of the three sides of the carousel body into alignment with the assembly line to deliver a framing gate to the track structure 26 for delivery to the framing station 14 following each turning movement of the carousel. To facilitate the rotation of the carousel body, pressurized air is delivered to air bags 90 to inflate the air bags and lift the carousel body off of support surface 88*a* while pressurized air flows through the diaphragm apertures 90*b* to form a film of air between the diaphragms of the air bags and the support surface 88*a*, thereafter motor 84 can be actuated to rotate the carousel body through 120° to bring successive sides of the carousel body into alignment with the assembly line. Note that (FIGS. 6 and 10) the downstream end 94*a* of track 94 is chamfered and that the ends 72*l* of carousel lower track 72*c* are complementarily chamfered so that as each side of the carousel body moves into alignment with the assembly line the respective chamfered end of the carousel lower track structure moves into a nesting, parallel disposition with respect to chamfered track end 94*c*.

During the rotation of the carousel body between successive positions, latch assembly 160 has been actuated in a manner such that the carousel body is free to turn relative to the carousel base and each gate carried by the carousel body is fixed with respect to the respective side of the carousel body by engagement of rollers 170 with precision dog 196. As a respective side of the carousel body carrying a desired framing gate arrives at a position in alignment with the assembly line, cylinder 176 is fired to latch the carousel body to the carousel base structure, thereafter air cylinder 134 is actuated to raise slide plate 126 and pivot dump member 106 upwardly about the axis of pivot shaft 118 to move the dog 154 on the framing gate into groove 122 on the receiver 106*b* of the dump member, thereafter cylinder 184 is fired to disengage rollers 170 from precision dog 196 to unlatch the framing gate from the carousel body, thereafter the delivery of pressurized air to the air bags 96 is discontinued to allow the carousel to settle back down onto the support surface 88*a*, thereafter servo motor 146 is actuated to drive powered pulley 140 and power endless belts 144 and the endless belts in turn move trolley 98 along the track structure 26 to move the framing gate along the track structure to the framing station. Specifically, as the trolley and the captured framing gate move along the track structure toward the framing station, the caterpillar bearings 152 on the lower edge of the framing gate crawl along the roundbar 70*c*, jump the gap between the roundbar 70*c* and the roundbar 96, and continue crawling along the roundbar 96 until the framing gate arrives in the proximity of the framing station.

Meanwhile, the trolley pushes the framing gate along the track structure, and is guided on the vertical rail 92 by virtue of the rollers 110 and the rollers 112, guided on the roundbar 72*j* of the carousel lower track structure by virtue of the sliding engagement of the arcuate groove 106*a* with the roundbar 72*j*, followed by sliding engagement of the arcuate groove 106*a* on the round bar 96; and guided on the lower track structure of the carousel body by virtue of the rolling engagement of the rollers 116 on the track apron 72*i* proximate the roundbar followed by rolling engagement of the rollers 116 on the horizontal guide plate 194 proximate the roundbar 196. The sliding movement of the framing gate along the track structure is further facilitated by the rolling engagement of the rollers 150 in the overhead angle irons 72*g* of the carousel followed by rolling engagement of the rollers 150 in overhead angle iron tracks 200 forming a continuation of the angle irons 72*g* and extending to a location overlying the framing station 14. As the gate approaches the framing station the pillars 56 an 58 are in the retracted or outboard positions to allow passage of the gate in front of the pillars to position the gate on the pillars. As the leading edge of the gate reaches and traverses the first pillar 58, the front caterpillar bearing 152 loses contact with rail 96 but the gate continues to be firmly guided during this brief transition time by the continued engagement of the trailing caterpillar bearing 152 on the roundbar 96, by the firm guidance of the overhead rollers 150 in the overhead tracks 200, and by the firm guidance of the lower edge of the trolley with the guide rail 92, the roundbar 96, and the horizontal rail 94 proximate the roundbar 96. Once the leading edge of the gate has traversed the pillar 58, the leading caterpillar bearing 152 engages the roundbar 164 and the movement of the framing gate continues until the leading edge of the framing gate encounters the second pillar 56 and moves past the second pillar 56 to position the gate against both pillars 56 and 58, at which time the framing gate is secured to the pillars in the matter described in U.S. Pat. No. 6,173,881, thereafter the pillars carrying the captured framing gate are moved from the outboard positions to the inboard positions to coact with the pillars and the matching framing gate 43 on the opposite side of the assembly line to firmly clamp a loosely preassembled vehicle body therebetween preparatory to the welding operation. As the pillars move forwardly to the inboard positions, the framing gate is able to move with the pillars by virtue of the passage of the overhead guide rollers 150 through suitable gaps 200*a* provided in the overhead guide rails 200.

The framing gate 42 will remain mounted on the pillars 56, 58 for coaction with the framing gate 43 carried by the pillars at the framing station on the opposite side of the assembly line for as long as it is desired to continue to build the same body style vehicle. Specifically, the pillars will be moved to an inboard position each time a vehicle body arrives, thereafter the vehicle body will be clamped, thereafter the vehicle body will be welded, thereafter the pillars will be moved outwardly to the outboard positions until the arrival of the next successive loosely preassembled vehicle body at the framing station, thereafter the pillars will again be moved to the inboard positions and the clamping and welding cycle repeated. This pattern will continue for as long as it is desired to continue to build the same body style. However, and in accordance with an important feature of the invention, the pair of framing gates 42, 43 required to build the specific body styles can be randomly and readily interchanged for any of the other sets of framing gate pairs (44, 45; 46, 47; 48, 49) without interrupting the build cycle time of the assembly line.

Figure 28:
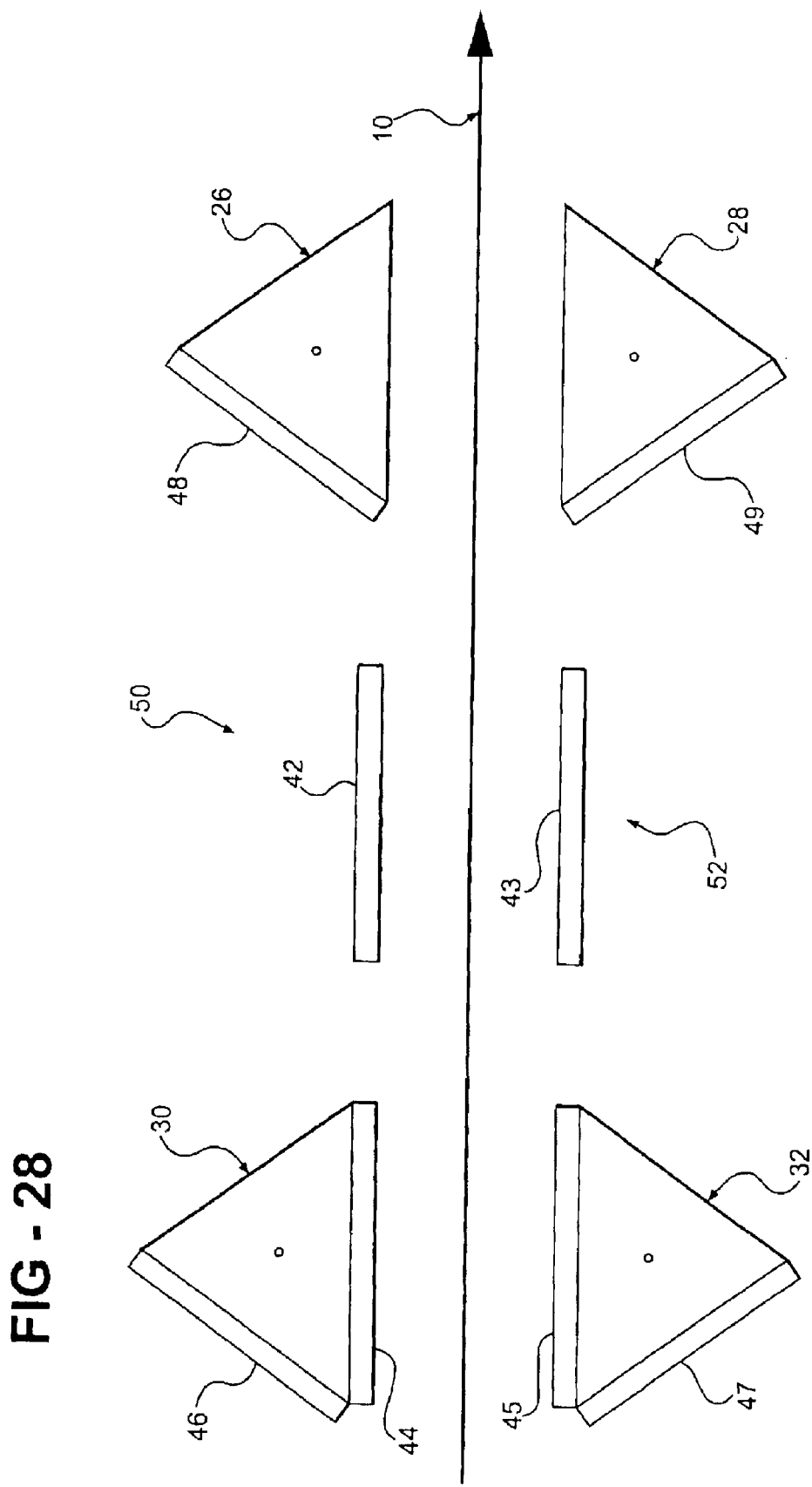
FIG. 28 is a schematic view illustrating the manner in which the framing system according to the present invention operates to interchange pairs of framing gates at the framing station.

That is, the combined rotary carousel and linear track arrangement of the invention allows the interchange of framing gates corresponding to four different body styles at the framing station without interrupting the build cycle time of the assembly line so that any mix of the four body styles can be provided at any time and during any time period without any penalty in the number of vehicles produced by the assembly line during that time period. For example, and with reference to FIG. 28, with framing gate pair 42 and 43 positioned on opposite sides of the framing station 14; framing gate pair 44 and 45 positioned respectively on first sides of the carousels 30 and 32 proximate the assembly line; framing gate pair 46 and 47 positioned respectively on second sides of carousels 30 and 32 removed from the assembly line; and framing gate pair 48 and 49 positioned respectively on first sides of carousels 26 and 28 removed from the assembly line, framing gates 42 and 43 can be randomly interchanged with any of the other pairs of framing gates within the build cycle time of the assembly line. Assuming a build cycle time for the assembly line of 45 seconds, the described arrangement, with the gates positioned as described, allows any of the gate pairs to be interchanged with the gate pair 42, 43 in less than 45 seconds. Specifically, it will be seen that an exchange can be accomplished by simple linear movements of gate pairs along the linear track structures or by a combination of linear movements of gate pairs along the linear track structures and rotary movement of selected carousels.

In the scenario where only linear movement of the involved gate pairs is required (as for example replacing gate pair 42, 43 with gate pair 44, 45 simply by moving gate pair 42, 43 linearly downstream from the framing station to the vacant side of carousels 26, 28 and moving gate pair 44, 45 downstream to the framing station) the exchange time consists of only approximately 3 seconds to perform the various latching and unlatching operations, and 5 seconds of linear sliding time for a total of approximately 8 seconds, well within the 45 second build cycle time target.

In the more complicated scenario where it is desired to exchange gate pairs 42 and 43 with gate pairs 46 and 47, carousels 30 and 32 are rotated counterclockwise through 120° to bring gates 46 and 47 into proximity with the assembly line while gate pair 42 and 43 is slid downstream to the vacant sides of carousels 26 and 28, thereafter gates 46 and 47 are slid downstream to opposite sides of the framing station. The total time for this operation being approximately 16 seconds to rotate the carousels, 5 seconds to perform the sliding operations, and approximately 3 seconds to perform the various latching operations for a total time of 26 seconds, again well within the 45 second build cycle time target.

To exchange gates 48 and 49 for gates 42 and 43, carousels 30/32 are rotated 120° clockwise to bring the vacant side of these carousels into alignment with the assembly line while carousels 26 and 28 are rotated 120° counterclockwise to bring gates 48 and 49 into proximity to the assembly line, thereafter gates 42/43 are slid upstream to occupy the vacant side of carousels 30/32 while gates 48/49 are slid upstream to move gates 48 and 49 to the opposite sides of the framing station. The total time for this exchange again being approximately 26 seconds, including 16 seconds to rotate the carousels, 5 seconds to perform the sliding operations, and approximately 3 seconds to perform the various latching operations, again well within the 45 second build cycle time target.

Similar analysis of the various frame interchange scenarios will establish that the combination of rotary and sliding movement allows the random interchange of four pairs of framing gates to allow the random production of any mix of four body styles on the assembly line without interrupting the build cycle time of the assembly line so that the assembly line can turn out the same number of vehicles irrespective of the mix amongst the four body styles. It will also be apparent that the arrangement allows the production of five body styles on the same assembly line, but, in this case, there are certain interchange scenarios where it would not be possible to interchange the pair of gates positioned at the framing station with another pair of gates positioned on one of the carousels within the build cycle time, even though certain interchanges would be possible within the build cycle time.

The invention apparatus and method will be seen to provide the random interchange of more than three pairs of side framing gates at a framing station while maintaining a predetermined build cycle time interval of the assembly line to allow any random mix of, for example, four body styles on a single assembly line without compromising the ability of the assembly line, to maintain operation at the predetermined build cycle time interval. Further, the apparatus and method according to the present invention, by virtue of its compact packaging, allows the random interchange to be performed in the context of the physical floorplan constraints of a typical motor vehicle assembly plant building and specifically allows the system to be installed within the typically 50' wide bays dictated by the structural columns of the building.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A body framing system for use with a vehicle assembly line in which loosely pre-assembled vehicle bodies are moved incrementally along a single assembly line from station to station, successive loosely pre-assembled vehicle bodies arrive at a framing station along the assembly line at predetermined build cycle time intervals, and each loosely pre-assembled vehicle body arriving at the framing station is welded to form a rigid vehicle body, the body framing system including:

the framing station;

a plurality of more than three pairs of opposed side framing gates for positioning at opposite sides of the framing station for use in welding a respective plurality of more than three vehicle body styles allowing random production of the plurality of more than three vehicle body styles on the single assembly line; and a transfer apparatus assembly operative for randomly exchanging any of the plurality of pairs of side framing gates positioned at the framing station with any other of the plurality of pairs of side framing gates within the predetermined build cycle time interval to allow the random production interchange of the more than three vehicle body styles on the single assembly line while maintaining the predetermined build cycle time interval.

2. The body framing system of claim 1, wherein the transfer apparatus assembly includes a rotary transfer apparatus coacting with a linear transfer apparatus.

3. The body framing system of claim 2, wherein the rotary transfer apparatus delivers framing gates to the linear transfer apparatus for delivery to the framing station.

4. The body framing system of claim 3, wherein the rotary transfer apparatus includes first and second carousels positioned on opposite sides of the assembly line upstream of the framing station and third and fourth carousels positioned on opposite sides of the production line downstream of the framing station.

5. The body framing system of claim 4, wherein the linear transfer apparatus includes a first linear track system extending from the first carousel to a first side of the framing station, a second linear track structure extending from the second carousel to a second, opposite side of the framing station, a third linear track structure extending from the third carousel to the first side of the framing station, and a fourth linear track structure extending from the fourth carousel to the second side of the framing station.

6. The body framing system of claim 5, wherein each carousel has a polygonal configuration including at least two sides, each side capable of receiving a framing gate.

7. The body framing system of claim 6, wherein the plurality of more than three pairs of opposed side framing gates includes four pairs of framing gates, and each carousel has three sides, wherein with the first pair of framing gates positionable on opposite sides of the framing station, the second pair of framing gates positionable on respective first sides of the first and second carousels, the third pair of framing gates positionable on respective second sides of the first and second carousels, and the fourth pair of framing gates positionable on respective first sides of the third and fourth carousels, all of the pairs of framing gates capable of being randomly interchanged by at least one of linear gate movements along the linear track structures and a combination of rotary movements of the carousels and linear gate movements along the linear track structures.

8. The body framing system of claim 5 further comprising:
a base structure;
a first pair of spaced pillars mounted on the base structure on the first side of the framing station, and
a second pair of spaced pillars mounted on the base structure on the second side of the framing station, the first and second pairs of pillars moveable on the base structure between outboard positions spaced outwardly from the assembly line and inboard positions proximate the assembly line, the first pair of pillars in its outboard position linearly aligned with the first and third linear track structures, and the second pair of pillars in its outboard position linearly aligned with the second and fourth linear track structures, wherein the framing gates are deliverable to the respective pillar pairs along the respective linear track structures with the pillar pairs in the outboard positions, thereafter the pillar pairs movable to the inboard positions to position the framing gates proximate the assembly line for clampingly engaging loosely preassembled vehicle bodies preparatory to welding operations.

9. A carousel for use in delivering framing gates to a framing station on a vehicle body assembly line, the carousel comprising:

a base structure positioned proximate the assembly line and including a support surface and a central pivot shaft upstanding from the support surface;
a carousel body supported on the support surface, mounted on the pivot shaft for rotary movement about the axis of the shaft, and defining a plurality of sides, each side adapted to receive a framing gate;
means operative for generating an air cushion between the support surface and an underface of the carousel body to lift the carousel body off of the support surface; and
means operative for applying a turning force to the carousel body to rotate the body about the central axis to bring successive sides of the body into a position proximate the assembly line.

10. The carousel of claim 9, wherein the air cushion generating means further comprises a plurality of air bags positioned on the underface of the carousel body and each air bag including a plurality of apertures in confronting relation to the support surface allowing pressurized air delivered to the air bags to inflate the bags to raise the carousel body off of the support surface and air escaping from the air bags through the apertures to generate an air cushion between the air bags and the support surface.

11. The carousel of claim 10, wherein the air bags are positioned in circumferentially spaced relation about the central axis of the pivot shaft.

12. The carousel of claim 10 intended for use with a linear track structure having ore end positioned proximate the framing station and a free end, and further comprising:
each side of the carousel body including a carousel track structure for supporting a respective framing gate and configured to be aligned with the free end of the linear track structure as the respective side of the carousel body is moved into a position proximate the assembly line allowing the framing gate to be slid off the carousel track structure and onto the linear track structure for delivery to the framing station.

13. A transfer apparatus for use in delivering framing gates to a framing station on a vehicle body assembly line, the transfer apparatus comprising:
a linear track structure having one end positioned proximate the framing station and a free end;
a carousel positioned proximate the assembly line, defining a plurality of sides each adapted to receive a framing gate, and mounted for rotation about a central axis to bring successive sides of the carousel into a position proximate the free end of the track structure and in linear alignment with the track structure; and
a transfer device operative to move a gate positioned on a side of the carousel in alignment with the track structure from the carousel side, onto the track structure, and along the track structure to the framing station.

14. The transfer apparatus of claim 13 further comprising a trolley operative to engage a gate and move the gate along the track structure to the framing station.

15. The transfer apparatus of claim 14, wherein each side of the carousel includes a carousel track structure for supporting a framing gate positioned on the respective side of the carousel and configured to be aligned with the free end of the linear track structure as the respective side of the carousel is moved into a position proximate the free end of the linear track structure.

16. The transfer apparatus of claim 15 further comprising:
a first latch device for latching a framing gate to a respective side of the carousel;

a base structure supporting the carousel;

a second latch device for latching the carousel to the base structure; and a latch control device operative in response to arrival of a carousel side at a position proximate the free end of the linear track structure to actuate the second latch device to latch the carousel to the base structure and release the first latch device to release the framing gate from the carousel and allow the trolley to move the released framing gate along the linear track structure to the framing station.

17. The transfer apparatus of claim 16 further comprising:

a third latch device to latch the trolley to a framing gate, the third latch device actuated prior to release of the first latch device and following engagement of the second latch device, and wherein the first latch device is released following engagement of the third latch device to allow the trolley to move the released framing gate to the framing station.

18. The transfer apparatus of claim 17 further comprising:

the base structure defining a support surface;

cushion means operative to generate an air cushion between the support surface and an underface of the carousel to lift the carousel off of the support surface; and turning means operative to apply a turning force to the lifted carousel to rotate the carousel about the central axis to bring successive sides of the carousel into position proximate the free end of the track structure and in linear alignment with the track structure.

19. The transfer apparatus of claim 18, wherein the second latch device is released following actuation of the cushion means, thereafter the turning means is actuated to bring a respective side of the carousel carrying a respective framing gate into alignment with the linear track structure, thereafter the second linear latch device is actuated to latch the carousel to the base structure, thereafter the third latch device is actuated to latch the trolley to the respective framing gate, thereafter the first latch device is released to release the respective framing gate from the carousel, and thereafter the trolley is actuated to move the respective framing gate to the framing station.

20. The transfer apparatus of claim 19, wherein the cushion means is deactivated to lower the carousel back down to the support surface prior to actuation of the trolley to move the respective framing gate to the framing station.

21. The carousel of claim 9 intended for use with a linear track structure having one end positioned proximate the framing station and a free end, and further comprising:

each side of the carousel body including a carousel track structure for supporting a respective framing gate and configured to be aligned with the free end of the linear track structure as the respective side of the carousel body is moved into a position proximate the assembly line allowing the framing gate to be slid off the carousel track structure and onto the linear track structure for delivery to the framing station.

22. The transfer apparatus of claim 13 further comprising:

a base structure defining a support surface;

means operative for rotatably supporting the carousel with respect to the support surface; and turning means operative to apply a turning force to the carousel to rotate the carousel about the central axis to bring successive sides of the carousel into position proximate the free end of the track structure and in linear alignment with the track structure.

23. A transfer apparatus for use in delivering framing gates to a framing station on a vehicle body assembly line, the transfer apparatus comprising:

a linear track structure having one end positioned proximate the framing station and a free end;

a carousel positioned proximate the assembly line, defining a plurality of sides each adapted to receive a framing gate, and mounted for movement to bring the carousel into a position proximate the free end of the track structure and in linear alignment with the track structure; and a transfer device operative to move a gate positioned on a side of the carousel in alignment with the track structure from the carousel side, onto the track structure, and along the track structure to the framing station.

24. The transfer apparatus of claim 23 further comprising a trolley operative to engage a gate and move the gate along the track structure to the framing station.

25. The transfer apparatus of claim 24, wherein each side of the carousel includes a carousel track structure for supporting a framing gate positioned on the respective side of the carousel and configured to be aligned with the free end of the linear track structure as the respective side of the carousel is moved into a position proximate the free end of the linear track structure.

26. The transfer apparatus of claim 25 further comprising:

a first latch device for latching a framing gate to a respective side of the carousel;

a base structure supporting the carousel;

a second latch device for latching the carousel to the base structure; and a latch control device operative in response to arrival of a carousel side at a position proximate the free end of the linear track structure to actuate the second latch device to latch the carousel to the base structure and release the first latch device to release the framing gate from the carousel and allow the trolley to move the released framing gate along the linear track structure to the framing station.

27. The transfer apparatus of claim 26 further comprising:

a third latch device to latch the trolley to a framing gate, the third latch device actuated prior to release of the first latch device and following engagement of the second latch device, and wherein the first latch device is released following engagement of the third latch device to allow the trolley to move the released framing gate to the framing station.

* * * * *